US012706691B2

(12) United States Patent
Berger et al.

(10) Patent No.: US 12,706,691 B2
(45) Date of Patent: Aug. 11, 2026

(54) MULTI-LEVEL CODING AND BIT-INTERLEAVED CODED MODULATION

(71) Applicant: QUALCOMM Incorporated, San Diego, CA (US)

(72) Inventors: Peer Berger, Hod Hasharon (IL); Idan Michael Horn, Hod Hasharon (IL); Shay Landis, Hod Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 367 days.

(21) Appl. No.: 18/479,665

(22) Filed: Oct. 2, 2023

(65) Prior Publication Data

US 2025/0112729 A1 Apr. 3, 2025

(51) Int. Cl.
*H04L 1/00* (2006.01)

(52) U.S. Cl.
CPC .......... *H04L 1/0058* (2013.01); *H04L 1/0071* (2013.01); *H04L 1/0076* (2013.01)

(58) Field of Classification Search
CPC ... H04L 1/0058; H04L 1/0071; H04L 1/0076; H04L 1/0045; H04L 1/0057; H04L 1/0075; H04L 1/0041; H03M 13/13
See application file for complete search history.

(56) References Cited

U.S. PATENT DOCUMENTS

2012/0084620 A1* 4/2012 Miyazaki .............. H04L 1/0067 714/752
2018/0139758 A1* 5/2018 Sankar .............. H04W 72/0466
2019/0200348 A1* 6/2019 Chae ..................... H04L 25/067
2022/0345351 A1* 10/2022 Gresset ................. H04L 1/0058
2024/0039558 A1* 2/2024 Du .......................... H04L 1/007

FOREIGN PATENT DOCUMENTS

WO 2022122438 A1 6/2022

OTHER PUBLICATIONS

International Search Report and Written Opinion—PCT/US2024/045275—ISA/EPO—Dec. 17, 2024.
Yao H., et al., "Polar Coded Modulation via Hybrid Bit Labeling", 2022 IEEE International Symposium on Information Theory (ISIT), IEEE, Jun. 26, 2022, pp. 980-985, XP034160618, The Whole Document.

* cited by examiner

*Primary Examiner* — Moo Jeong
*Assistant Examiner* — David Zhijun Sun
(74) *Attorney, Agent, or Firm* — Harrity & Harrity LLP

(57) ABSTRACT

Various aspects of the present disclosure generally relate to wireless communication. In some aspects, a user equipment (UE) may transmit capability information indicating that the UE is configured to perform multi-level coding (MLC) decoding for one or more bits of a plurality of constellation bits. The UE may receive, in accordance with the capability information, configuration information that indicates to perform bit-interleaved coded modulation (BICM) decoding for a first set of bits of the plurality of constellation bits and that indicates to perform MLC decoding for a second set of bits of the plurality of constellation bits, the second set of bits being based at least in part on the capability information. Numerous other aspects are described.

30 Claims, 16 Drawing Sheets

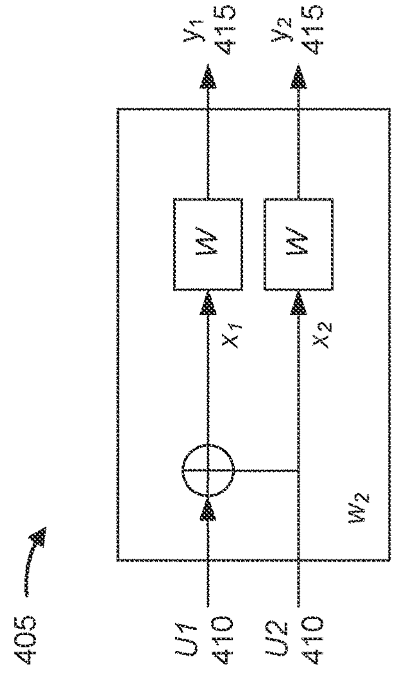
FIG. 4
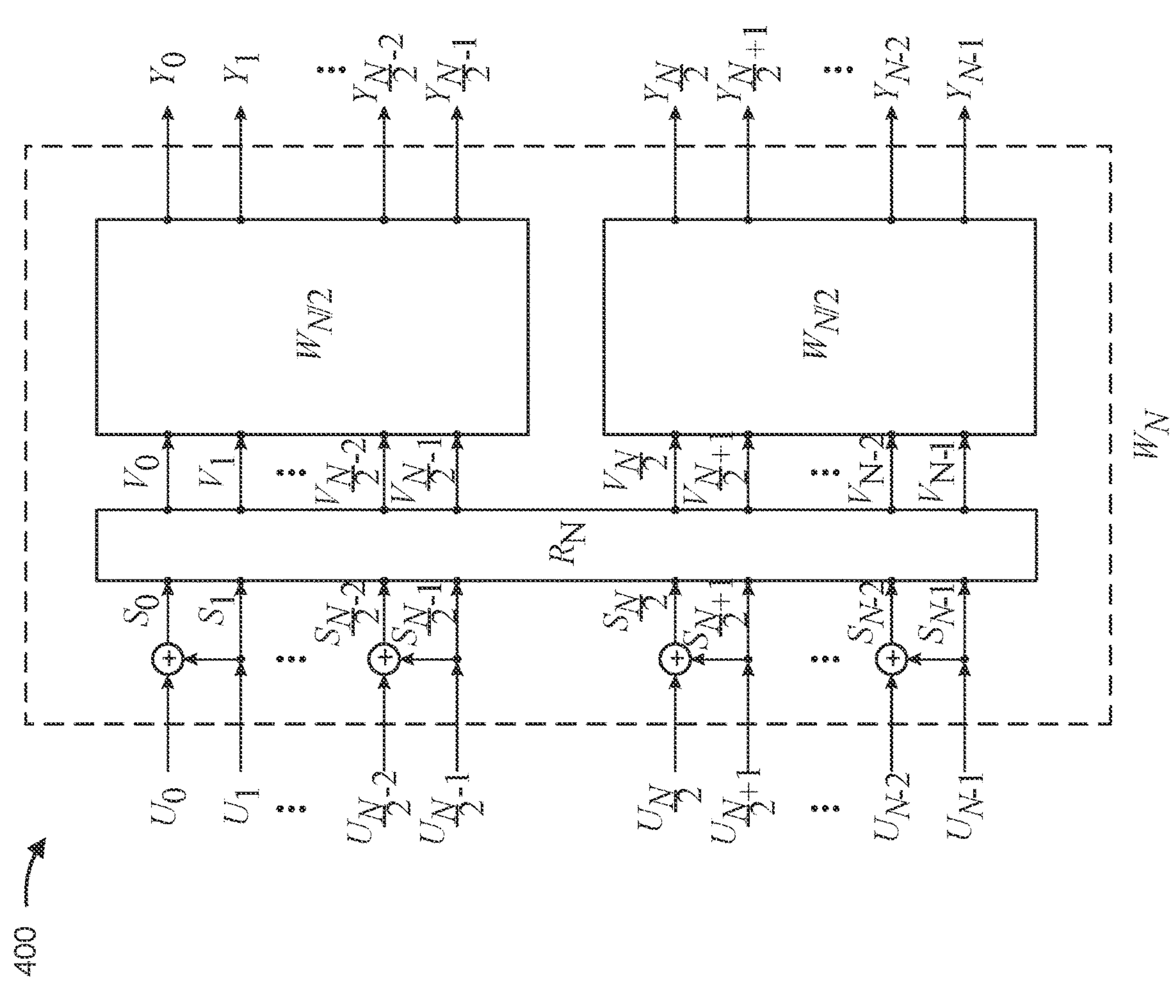

710

700

MULTI-LEVEL CODING AND BIT-INTERLEAVED CODED MODULATION

FIELD OF THE DISCLOSURE

Aspects of the present disclosure generally relate to wireless communication and to techniques and apparatuses for multi-level coding and bit-interleaved coded modulation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting capability information indicating that the UE is configured to perform multi-level coding (MLC) decoding for one or more bits of a plurality of constellation bits; and receiving, in accordance with the capability information, configuration information that indicates to perform bit-interleaved coded modulation (BICM) decoding for a first set of bits of the plurality of constellation bits and that indicates to perform MLC decoding for a second set of bits of the plurality of constellation bits, the second set of bits being based at least in part on the capability information.

In some aspects, a method of wireless communication performed by a network node includes receiving capability information indicating that a UE is configured to perform MLC decoding for one or more bits of a plurality of constellation bits; and transmitting, in accordance with the capability information, configuration information that indicates for the UE to perform BICM decoding for a first set of bits of the plurality of constellation bits and to perform MLC decoding for a second set of bits of the plurality of constellation bits, the second set of bits being based at least in part on the capability information.

In some aspects, an apparatus for wireless communication at a UE includes one or more memories; and one or more processors, coupled to the one or more memories, configured to cause the UE to: transmit capability information indicating that the UE is configured to perform MLC decoding for one or more bits of a plurality of constellation bits; and receive, in accordance with the capability information, configuration information that indicates to perform BICM decoding for a first set of bits of the plurality of constellation bits and that indicates to perform MLC decoding for a second set of bits of the plurality of constellation bits, the second set of bits being based at least in part on the capability information.

In some aspects, an apparatus for wireless communication at a network node includes one or more memories; and one or more processors, coupled to the one or more memories, configured to cause the network node to: receive capability information indicating that a UE is configured to perform MLC decoding for one or more bits of a plurality of constellation bits; and transmit, in accordance with the capability information, configuration information that indicates for the UE to perform BICM decoding for a first set of bits of the plurality of constellation bits and to perform MLC decoding for a second set of bits of the plurality of constellation bits, the second set of bits being based at least in part on the capability information.

In some aspects, a non-transitory computer-readable medium storing a set of instructions for wireless communication includes one or more instructions that, when executed by one or more processors of a UE, cause the UE to: transmit capability information indicating that the UE is configured to perform MLC decoding for one or more bits of a plurality of constellation bits; and receive, in accordance with the capability information, configuration information that indicates to perform BICM decoding for a first set of bits of the plurality of constellation bits and that indicates to perform MLC decoding for a second set of bits of the plurality of constellation bits, the second set of bits being based at least in part on the capability information.

In some aspects, a non-transitory computer-readable medium storing a set of instructions for wireless communication includes one or more instructions that, when executed by one or more processors of a network node, cause the network node to: receive capability information indicating that a UE is configured to perform MLC decoding for one or more bits of a plurality of constellation bits; and transmit, in accordance with the capability information, configuration information that indicates for the UE to perform BICM decoding for a first set of bits of the plurality of constellation bits and to perform MLC decoding for a second set of bits of the plurality of constellation bits, the second set of bits being based at least in part on the capability information.

In some aspects, an apparatus for wireless communication includes means for transmitting capability information indicating that the apparatus is configured to perform MLC decoding for one or more bits of a plurality of constellation bits; and means for receiving, in accordance with the capability information, configuration information that indicates to perform BICM decoding for a first set of bits of the plurality of constellation bits and that indicates to perform MLC decoding for a second set of bits of the plurality of constellation bits, the second set of bits being based at least in part on the capability information.

In some aspects, an apparatus for wireless communication includes means for receiving capability information indicating that a UE is configured to perform MLC decoding for one or more bits of a plurality of constellation bits; and means for transmitting, in accordance with the capability information, configuration information that indicates for the UE to perform BICM decoding for a first set of bits of the plurality of constellation bits and to perform MLC decoding for a second set of bits of the plurality of constellation bits, the second set of bits being based at least in part on the capability information.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of polar codes, in accordance with the present disclosure.

DETAILED DESCRIPTION

Figure 1:
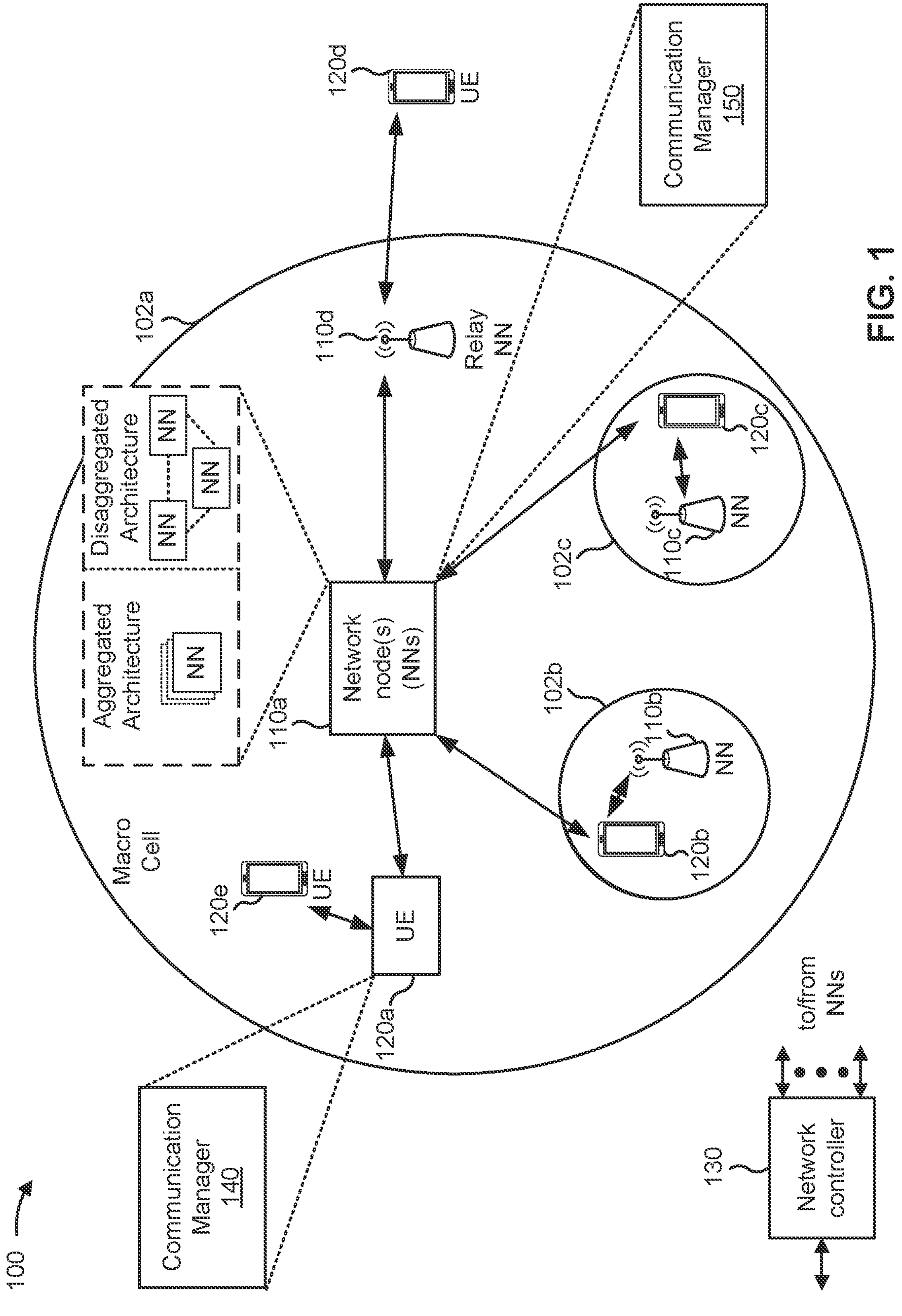
FIG. 1 is a diagram illustrating an example of a wireless network, in accordance with the present disclosure.

Polar codes are error-correcting codes that are used in communication signals. Polar codes may include information bits that are systematically transformed into a set of coded bits in accordance with a polarizing effect of a channel. Multi-level coding (MLC) is a technique for transmitting data over a communication channel that involves encoding data into multiple levels, where each level has a different protection or redundancy. This may be used, for example, to improve communication reliability in the presence of noise or interference. At a transmitting device, each bit index in a constellation may be associated with a different code, and a code rate may be set in accordance with a bit index capacity. At a receiving device, the codes may be decoded sequentially (e.g., one after the other), and each bit may be decoded in accordance with information obtained from decoding one or more previous bits. In some cases, MLC may be compatible with set partitioning (SP) labeling that maximizes a Euclidean distance in the constellation. Set partitioning may include dividing a modulation constellation into subsets or partitions of signal points, where each subset has its own properties or characteristics, which may be useful for different aspects of communication system design.

Bit-interleaved coded modulation (BICM) is a technique for transmitting data in a digital communication system that combines error correction coding and modulation to achieve more reliable and efficient communication. At a transmitting device, BICM may include applying error correction codes (e.g., channel codes) to add redundancy to data to be transmitted over a network, mapping the coded bits into symbols, and interleaving the bits to spread out the bits and, therefore, reduce a likelihood of error during the data transmission. At a receiving device, BICM may include demodulating the coded bits to recover the coded bits, de-interleaving, and decoding. In some cases, BICM may be compatible with gray labeling. Gray labeling is a technique for applying a gray coding scheme in signal modulation. In some cases, gray labeling may include assigning labels or codewords to different points in a modulation constellation in a way that reduces a likelihood of errors when, for example, the signals are received in noisy communication channels. Gray labeling may include applying a modulation constellation to encode digital data into analog signals that can be transmitted over a wireless channel, and applying a gray coding that uses a binary-to-symbol mapping technique to label the points in the modulation constellation. Gray labeling may assist with error reduction, for example, by comparing a received symbol to a nearest (in terms of Euclidean distance) constellation point to increase a likelihood of detecting the correct symbol and/or recovering the correct bits. Additionally, gray labeling may lead to performance improvement by reducing bit error rate (BER) and symbol error rate (SER) compared to other labeling schemes.

In some cases, polar codes may be used as error correcting codes for physical downlink control channel (PDCCH) communications. A PDCCH constellation for PDCCH communications may have quadrature phase shift keying (QPSK) characteristics, with no protection difference between the bits. In some cases, polar codes may be used as candidates for other communication channels, such as physical downlink shared channel (PDSCH) communications, including higher constellations. Pairing polar codes with high modulation (e.g., m>2), and unlink PDCCH QPSK communications, modifications may be needed in order to achieve a performance metric. In some cases, MLC may result in better performance compared to BICM. However, MLC may be more complex and may require more network and processing resources compared to BICM. In some cases, it may be beneficial to use a combination of BICM and MLC to achieve improved performance while reducing complexity. However, a user equipment (UE) and a network node may not be configured to communicate information regarding the joint BICM and MLC processing, and therefore, joint BICM and MLC may not be supported by the UE and/or the network node.

Various aspects relate generally to wireless communications. Some aspects more specifically relate to joint BICM and MLC processing. In some aspects, a UE may transmit capability information indicating that the UE is configured to perform MLC decoding for one or more bits of a plurality of constellation bits. For example, the UE may transmit a plurality of capability information bits, where a first value of a bit of the plurality of capability information bits indicates that the UE is not configured to perform MLC decoding associated with the bit, and a second value of the bit of the plurality of capability information bits indicates that the UE is configured to perform MLC decoding associated with the bit. A network node may select one or more frozen bits in accordance with the capability information. For example, the network node may select a frozen bit table in accordance with the plurality of capability information bits, and the UE may adjust a mapping or a decoding scheme in accordance with the frozen bit table. In some aspects, the network node may transmit, and the UE may receive, configuration information that indicates for the UE to perform BICM decoding for a first set of bits of the plurality of constellation bits and that indicates to perform MLC decoding for a second set of bits of the plurality of constellation bits. In some examples, the BICM decoding may be BICM decoding with gray labeling and the MLC decoding may be MLC decoding with set partitioning labeling. The UE may perform, in accordance with the configuration information, BICM decoding for the first set of bits of the plurality of constellation bits and MLC decoding for the second set of bits of the plurality of constellation bits. For example, the UE may perform BICM decoding with gray labeling for a first two bits of a four-bit constellation, and may perform MLC decoding with set partitioning for a last two bits of the four-bit constellation.

Particular aspects of the subject matter described in this disclosure can be implemented to realize one or more of the following potential advantages. In some examples, by communicating the capability information, the described techniques can be used to enable the UE and the network node to perform joint BICM and MLC processing. For example, the capability information may indicate one or more bits that are capable of being decoded using MLC, and may indicate that a remainder of bits are not capable of being decoded using MLC. In some examples, by communicating the configuration information, the described techniques can be used to enable the network node to instruct the UE to perform BICM decoding for a first set of constellation bits and to perform MLC decoding for a second set of constellation bits. This may reduce decoding complexity while improving decoding performance. For example, the described techniques may enable BICM decoding to be performed on a first portion of the constellation bits associated with a higher polarization, thereby reducing decoding complexity, while enabling MLC decoding to be performed on a second portion of the constellation bits associated with a lower polarization, thereby increasing decoding accuracy. These example advantages, among others, are described in more detail below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit capability information indicating that the UE is configured to perform MLC decoding for one or more bits of a plurality of constellation bits; and receive, in accordance with the capability information, configuration information that indicates to perform BICM decoding for a first set of bits of the plurality of constellation bits and that indicates to perform MLC decoding for a second set of bits of the plurality of constellation bits, the second set of bits being based at least in part on the capability information. Additionally, or alternatively, the communication manager 140 may perform one or more other operations described herein.

In some aspects, the network node 110 may include a communication manager 150. As described in more detail elsewhere herein, the communication manager 150 may receive capability information indicating that a UE is configured to perform MLC decoding for one or more bits of a plurality of constellation bits; and transmit, in accordance with the capability information, configuration information that indicates for the UE to perform BICM decoding for a first set of bits of the plurality of constellation bits and to perform MLC decoding for a second set of bits of the plurality of constellation bits, the second set of bits being based at least in part on the capability information. Additionally, or alternatively, the communication manager 150 may perform one or more other operations described herein.

As indicated above, FIG. 1 is provided as an example. Other examples may differ from what is described with regard to FIG. 1.

Figure 2:
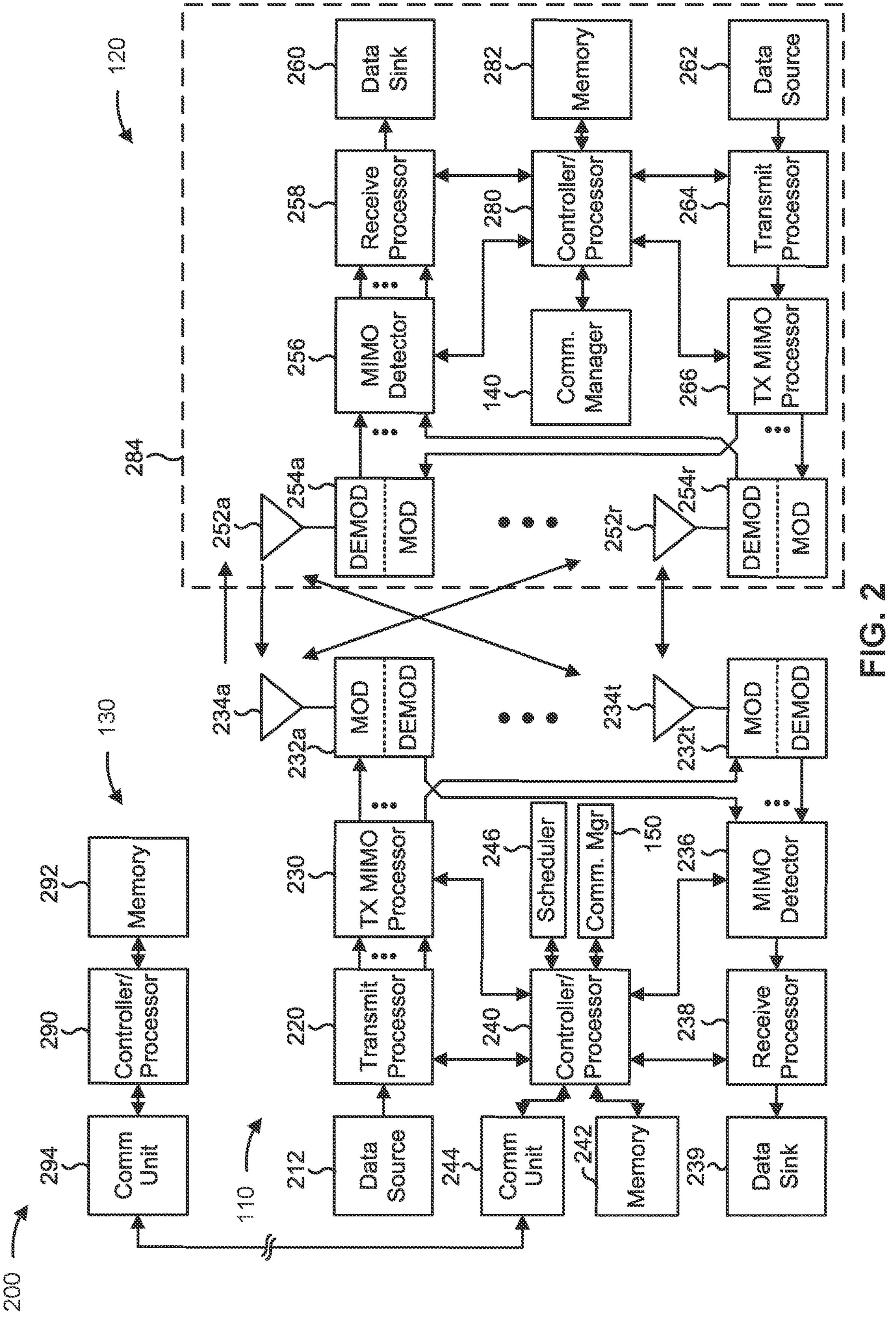
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-16).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-16).

The controller/processor 240 of the network node 110, the controller/processor 280 of the UE 120, and/or any other component(s) of FIG. 2 may perform one or more techniques associated with MLC and BICM decoding, as described in more detail elsewhere herein. For example, the controller/processor 240 of the network node 110, the controller/processor 280 of the UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE 120 includes means for transmitting capability information indicating that the UE is configured to perform MLC decoding for one or more bits of a plurality of constellation bits; and/or means for receiving, in accordance with the capability information, configuration information that indicates to BICM decoding for a first set of bits of the plurality of constellation bits and that indicates to perform MLC decoding for a second set of bits of the plurality of constellation bits, the second set of bits being based at least in part on the capability information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving capability information indicating that a UE is configured to perform MLC decoding for one or more bits of a plurality of constellation bits; and/or means for transmitting, in accordance with the capability information, configuration information that indicates for the UE to perform BICM decoding for a first set of bits of the plurality of constellation bits and to perform MLC decoding for a second set of bits of the plurality of constellation bits, the second set of bits being based at least in part on the capability information. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
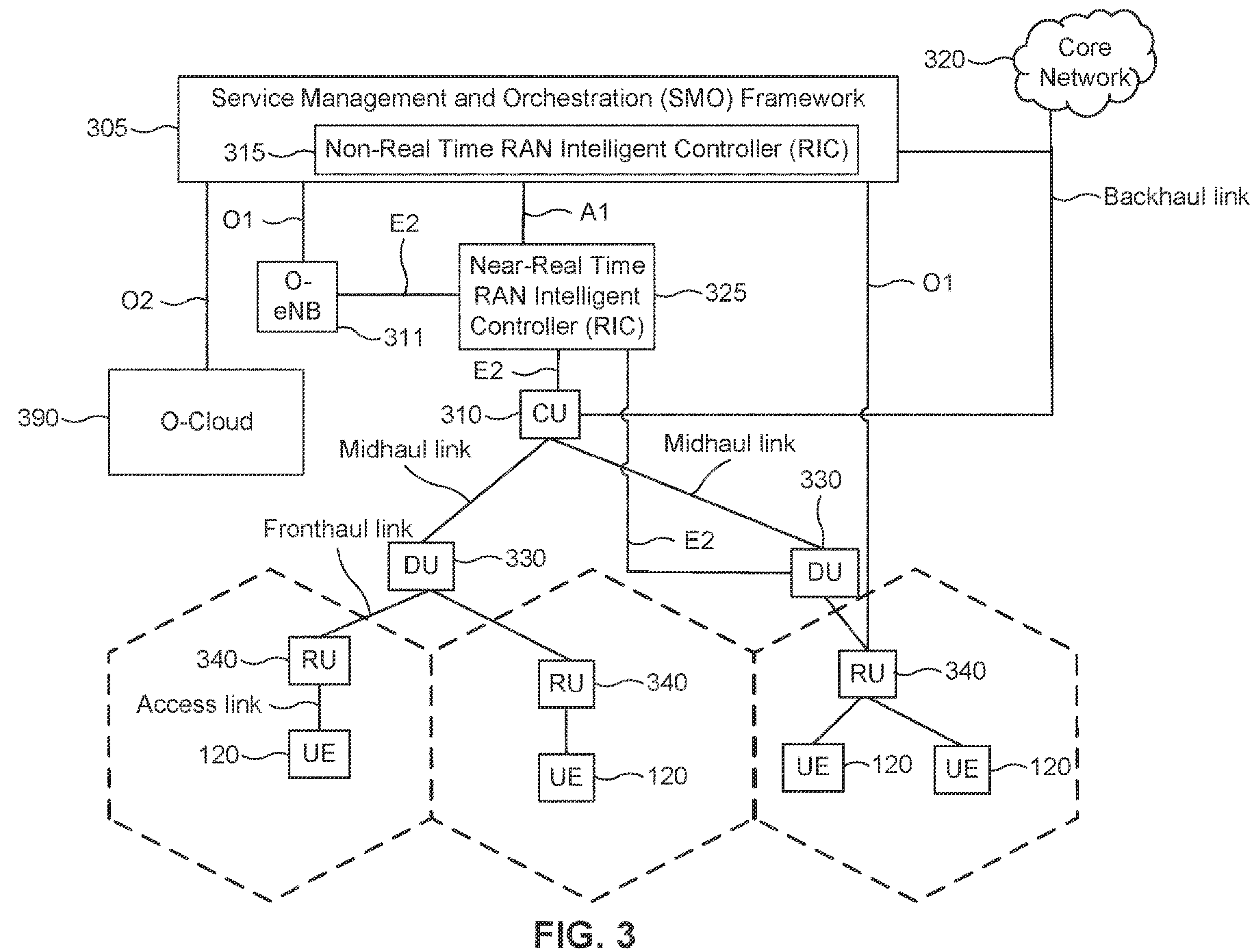
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example of polar codes, in accordance with the present disclosure.

Polar codes are error-correcting codes that are used in communication signals. Polar codes may include information bits that are transformed into a set of coded bits in accordance with a polarizing effect of a channel. Polar codes may be generated by an encoder, such as an encoder 400, where:

N is a length of the polar code, which corresponds to a total number of bits (information and frozen bits) in a single code block, K is a number of information bits, which is generally less than or equal to N (e.g., since polar codes are often used for error correction), G is a generator matrix for the polar codes, which may have a size N×N, U is a set of information bits (e.g., bits that are to be transmitted without error), V is a set of intermediate bits (e.g., used to create a codeword), F is a set of frozen bits (e.g., bits that are stored at the transmitter and the receiver, and may be used for error correction), X is a quantity of input bits to the encoder (which may include a combination of the information bits and the frozen bits), W is an output of the encoder, and B is a bit-reversed order of the polar codes (which may be used for encoding).

In some cases, polar codes may be generated using two bits (e.g., 0 and 1). An example encoder for encoding polar codes using two bits is shown by reference number 405. The encoder may receive one or more inputs U 410 and may generate one or more outputs y 415 in accordance with the following:

$$G_{[u+v,v]2} = F_{u+v,v} = \begin{matrix} 1 & 0 \\ 1 & 1 \end{matrix},$$

-continued $$U_1^2 * G_2 = X_1, \text{ and}$$

$$X_1^2 * W_0^{N-1} = Y_1^2.$$

And for general size N (power of two):

$$G_{[u+v,v]N} = B_{[binary]N} * F_{u+v,v}^{\oplus n},$$

$$U_0^{N-1} + G_N = X_0^{N-1}, \text{ and}$$

$$X_0^{N-1} \to W_0^{N-1} \to Y_0^{N-1}.$$

In some cases, polar codes may be presented in different ways. For example, as shown by reference number 405, two inner codes may have size N/2. However, in another example, there may be N/2 polar codes having a size of size two (or any other size of inner code which is a power of two (the kernel size)). The number of inner codes may be identified such that the multiplication will be N. In some cases, polar codes may be combined with high modulation using MLC or BICM. Additional details regarding these features are described in FIGS. 5-7.

As indicated above, FIG. 4 is provided as an example. Other examples may differ from what is described with regard to FIG. 4.

Figure 5:
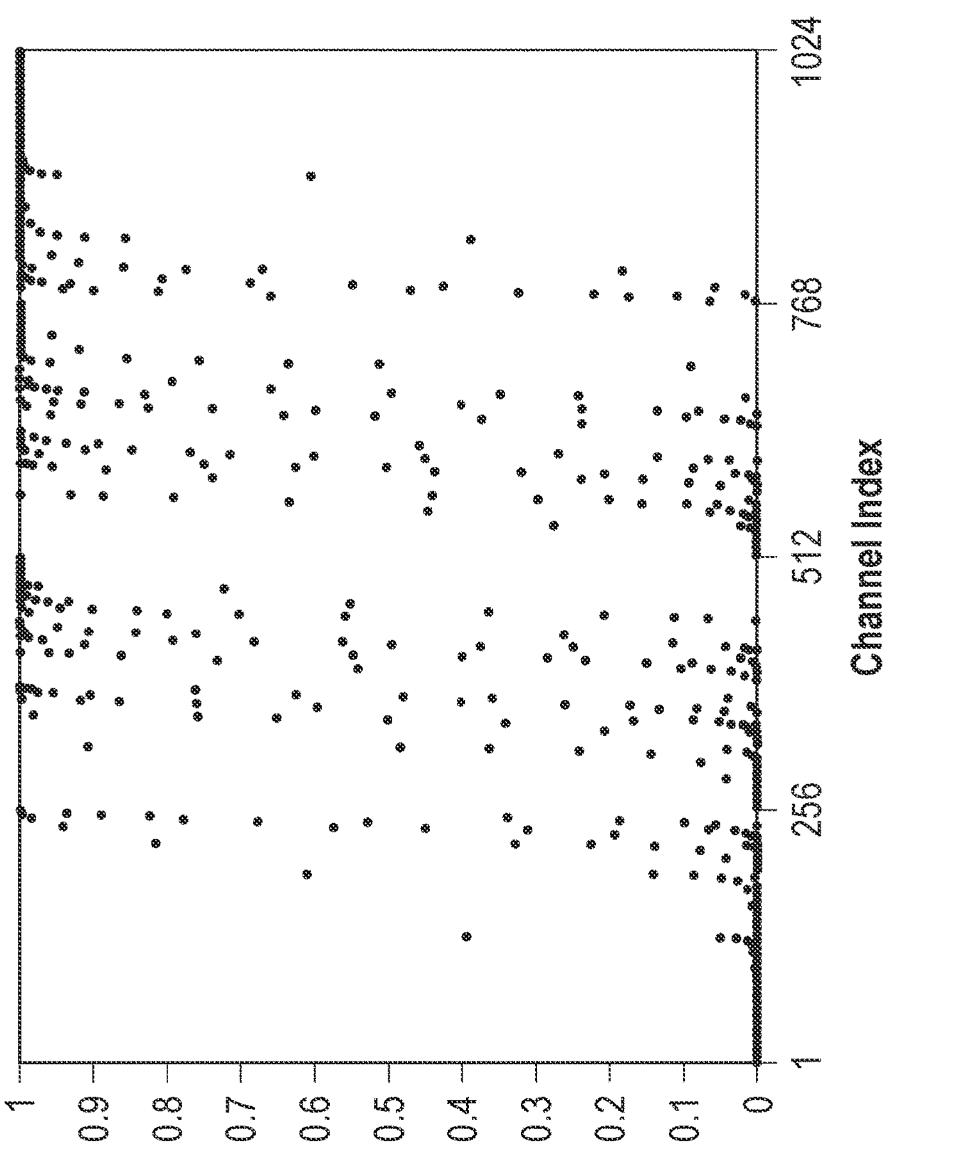
FIG. 5 is a diagram illustrating an example of a constellation for polar codes, in accordance with the present disclosure.

FIG. 5 is a diagram illustrating an example 500 of a mapping for polar codes, in accordance with the present disclosure. A capacity of each encoder input bit may be mapped in accordance with a symmetric capacity and a channel index. In some cases, some of the bits may experience a bit channel with a bit error rate (BER) of zero and a capacity of one (BER=0, Capacity=1), while other bits may experience a BER of 0.5 and a capacity of 0 (BER=0.5, Capacity=0). A proportion of noiseless bit channels may converge (e.g., for N that is sufficiently large) to the channel capacity. For encoding, given the channel (capacity), the indexes of the N bit channels can be sorted. To transmit using a rate R, data may be transmitted in a best (e.g., maximum capacity and/or minimum BER) K bit channels, where R=K/N. In the other N-K bits, the encoder may use fixed values known to the decoder (frozen bits). In some cases, the decoder may be a successive cancellation list (SCL) decoder, and/or may be another decoder with an appropriate block error rate (BLER) performance characteristic.

As indicated above, FIG. 5 is provided as an example. Other examples may differ from what is described with regard to FIG. 5.

Figure 6:
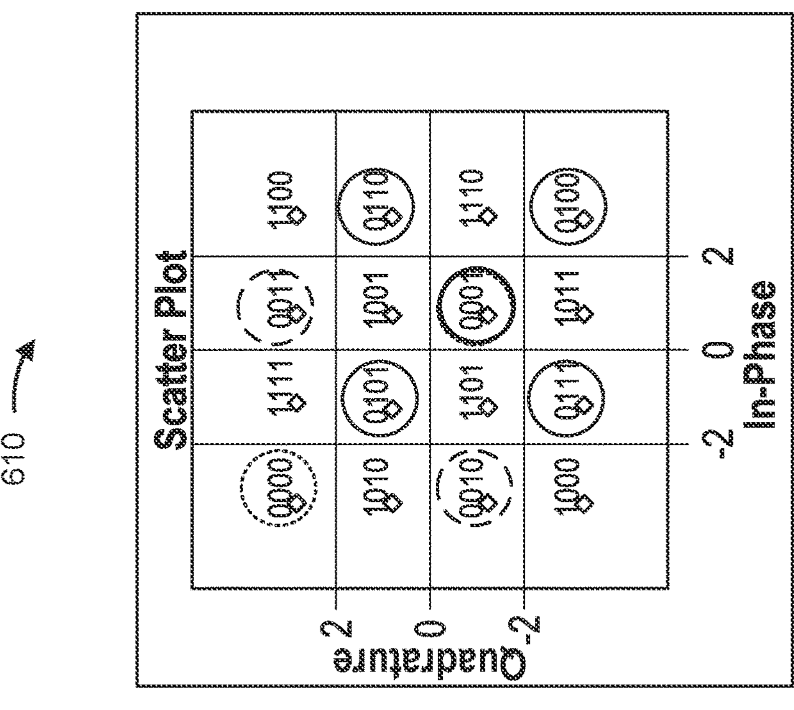
FIG. 6 is a diagram illustrating an example of multi-level coding, in accordance with the present disclosure.
Figure 6:
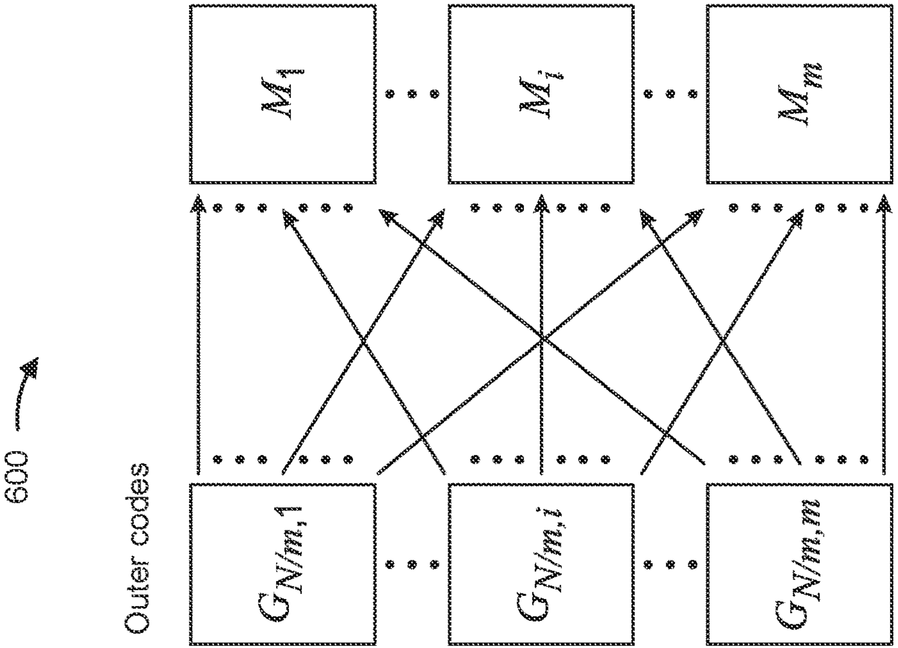

FIG. 6 is a diagram illustrating an example 600 of multi-level coding, in accordance with the present disclosure.

Multi-level coding (MLC) is a technique for transmitting data over a communication channel that involves encoding data into multiple levels (or levels), where each level (or level) has a different protection or redundancy. This may be used, for example, to improve communication reliability in the presence of noise or interference. At a transmitting device, each bit index in a constellation may be associated with a different code, and a code rate may be set in accordance with a bit index capacity. At a receiving device, the codes may be decoded sequentially (e.g., one after the other), and each bit may be decoded in accordance with information obtained from decoding one or more previous bits. As shown in the example 600, an MLC scheme may be represented by $$G_{\frac{N}{m},i},$$

where m is the quantity or outs in the constellation and i is a select bit of a total quantity of bits in the constellation. Additionally, as shown in the example 610, a scatter plot may be used to map the MLC bits in accordance with an in-phase indicator and a quadrature indicator. In some cases, MLC may be performed in accordance with the following information chain rule:

$$I(U;Y) = \sum\nolimits_{i=1}^{m} I\left(U_i; Y \mid U_1^{i-1}\right).$$

MLC complexity may be slightly higher than BICM complexity, for example, due to a recursive de-mapping process, such as by generating a log likelihood ratio (LLR) for each outer code in accordance with the previously decoded bits. In some cases, MLC may be compatible with set partitioning labeling that maximizes a Euclidean distance in the constellation. Set partitioning may include dividing a modulation constellation into subsets or partitions of signal points, where each subset has its own properties or characteristics, which can be useful for different aspects of communication system design.

As indicated above, FIG. 6 is provided as an example. Other examples may differ from what is described with regard to FIG. 6.

Figure 7:
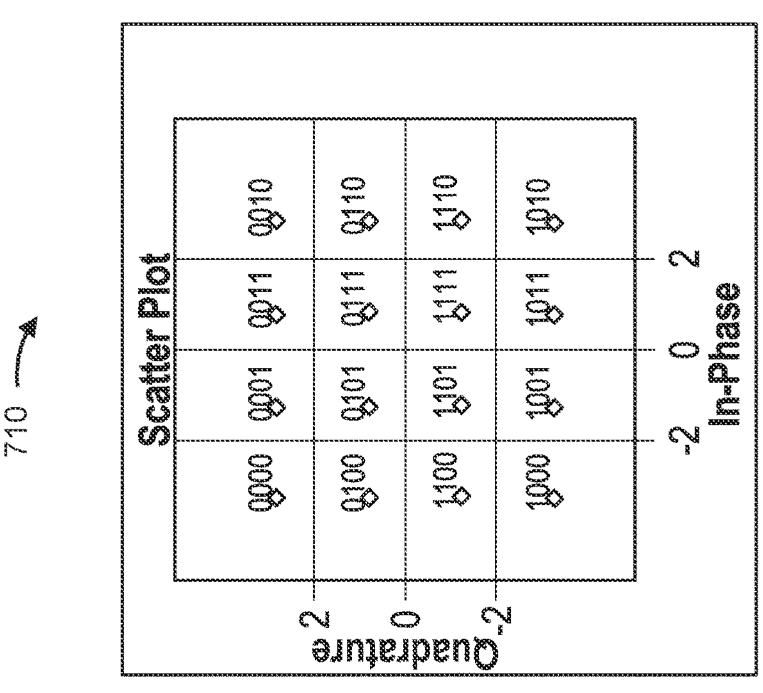
FIG. 7 is a diagram illustrating an example of bit-interleaved coded modulation, in accordance with the present disclosure.
Figure 7:
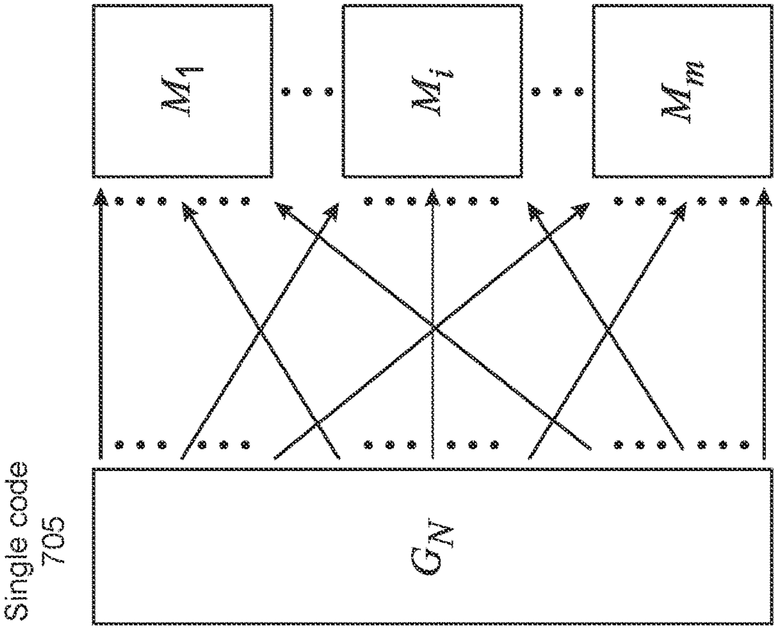

FIG. 7 is a diagram illustrating an example 700 of bit-interleaved coded modulation, in accordance with the present disclosure.

Bit-interleaved coded modulation is a technique for transmitting data in a digital communication system that combines error correction coding and modulation to achieve more reliable and efficient communication. At a transmitting device, BICM may include applying error correction codes (e.g., channel codes) to add redundancy to data to be transmitted over a network, mapping the coded bits into symbols, and interleaving the bits to spread out the bits and, therefore, reduce a likelihood of error during the data transmission. At a receiving device, BICM may include demodulating the coded bits to recover the coded bits, de-interleaving, and decoding. As shown in the example 700, a single code 705 (shown as GN) may be used for BICM. Additionally, as shown in the example 710, a scatter plot may be used to map the BICM bits in accordance with an in-phase indicator and a quadrature indicator. In some cases, as shown below, BICM may be less optimal than MLC from a perspective of the information chain rule:

$$\sum\nolimits_{i=1}^{m} I(U_i; Y) \le \sum\nolimits_{i=1}^{m} I\left(U_i; Y \mid U_1^{i-1}\right) = I(U;Y).$$

In some cases, BICM may be compatible with gray labeling. Gray labeling is a technique for applying a gray coding scheme in signal modulation. In some cases, gray labeling may include assigning labels or codewords to different points in a modulation constellation in a way that reduces a likelihood of errors, for example, when the signals are received in noisy communication channels. Gray labeling may include applying a modulation constellation to encode digital data into analog signals that can be transmitted over a wireless channel, and applying a gray coding that uses a binary-to-symbol mapping technique to label the points in the modulation constellation. Gray labeling may assist with error reduction, for example, by comparing a received symbol to a nearest (in terms of Euclidean distance) constellation point to increase a likelihood of detecting the correct symbol and/or recovering the correct bits. Additionally, gray labeling may lead to performance improvement by reducing BER and symbol error rate (SER) compared to other labeling schemes.

As indicated above, FIG. 7 is provided as an example. Other examples may differ from what is described with regard to FIG. 7.

Figure 8:
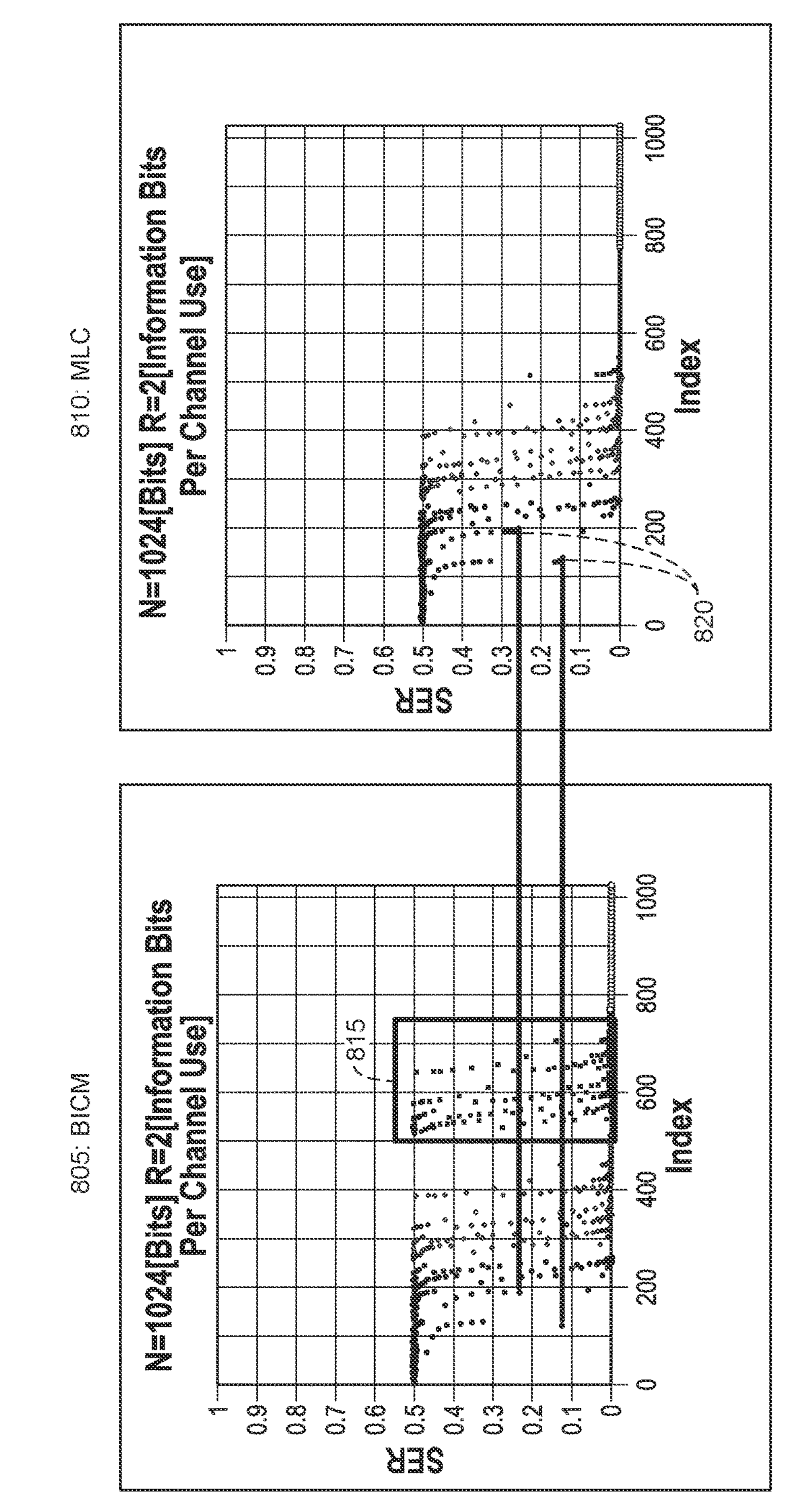
FIG. 8 is a diagram illustrating an example of comparing multi-level coding and bit-interleaved coded modulation, in accordance with the present disclosure.

FIG. 8 is a diagram illustrating an example 800 of comparing multi-level coding and bit-interleaved coded modulation, in accordance with the present disclosure.

As described herein, polar codes are error-correcting codes that are used in communication signals. Polar codes may include information bits that are transformed into a set of coded bits in accordance with a polarizing effect of a channel. In some cases, polar codes may be used as the error correcting codes for PDCCH communications. A PDCCH constellation for PDCCH communications may have QPSK characteristics, with no protection difference between the bits. Additionally, in some cases, polar codes may be used as candidates for other communication channels, such as PDSCH communications, including higher constellations. Pairing polar codes with high modulation (e.g., m>2) is not trivial, and unlike PDCCH QPSK communications, modifications may be needed in order to achieve a performance metric. In some cases, MLC may result in better performance compared to BICM. However, MLC may be more complex and may require more network and processing resources compared to BICM. In some cases, it may be beneficial to use a combination of BICM and MLC for achieving improved performance while reducing complexity. However, the UE and the network node may not be configured to communicate information regarding the joint BICM and MLC processing, and therefore, joint BICM and MLC may not be supported by the UE and/or the network node.

Example 800 shows a comparison of BICM decoding and MLC decoding. As shown by reference number 805, the BICM decoding may be in accordance with N=1024 bits and R=2 information bits per channel use. As shown by reference number 810, the MLC decoding may be in accordance with N=1024 bits and R=2 information bits per channel use. As shown by reference number 815, in a second half of the index, MLC bit capacity may be better than BICM bit capacity. For example, there is almost zero symbol error rate (SER) in the second half of the index for MLC. However, as shown by reference number 820, for some bits, BICM bit capacity may be slightly better than MLC bit capacity. For example, a lower SER may result in a higher bit capacity. In some cases, sorting may be different between the BICM and MLC schemes (for example, lower SER results in larger capacity, and bits with the largest SER may be frozen). The polarization of a second portion of the bits (e.g., a second half of the bits) may be improved in MLC (for example, due to the increased Euclidean distance), while the polarization of a first portion of the bits (e.g., a first half of the bits) is slightly better in the BICM (for example, due to the gray labeling).

As indicated above, FIG. 8 is provided as an example. Other examples may differ from what is described with regard to FIG. 8.

Figure 9:
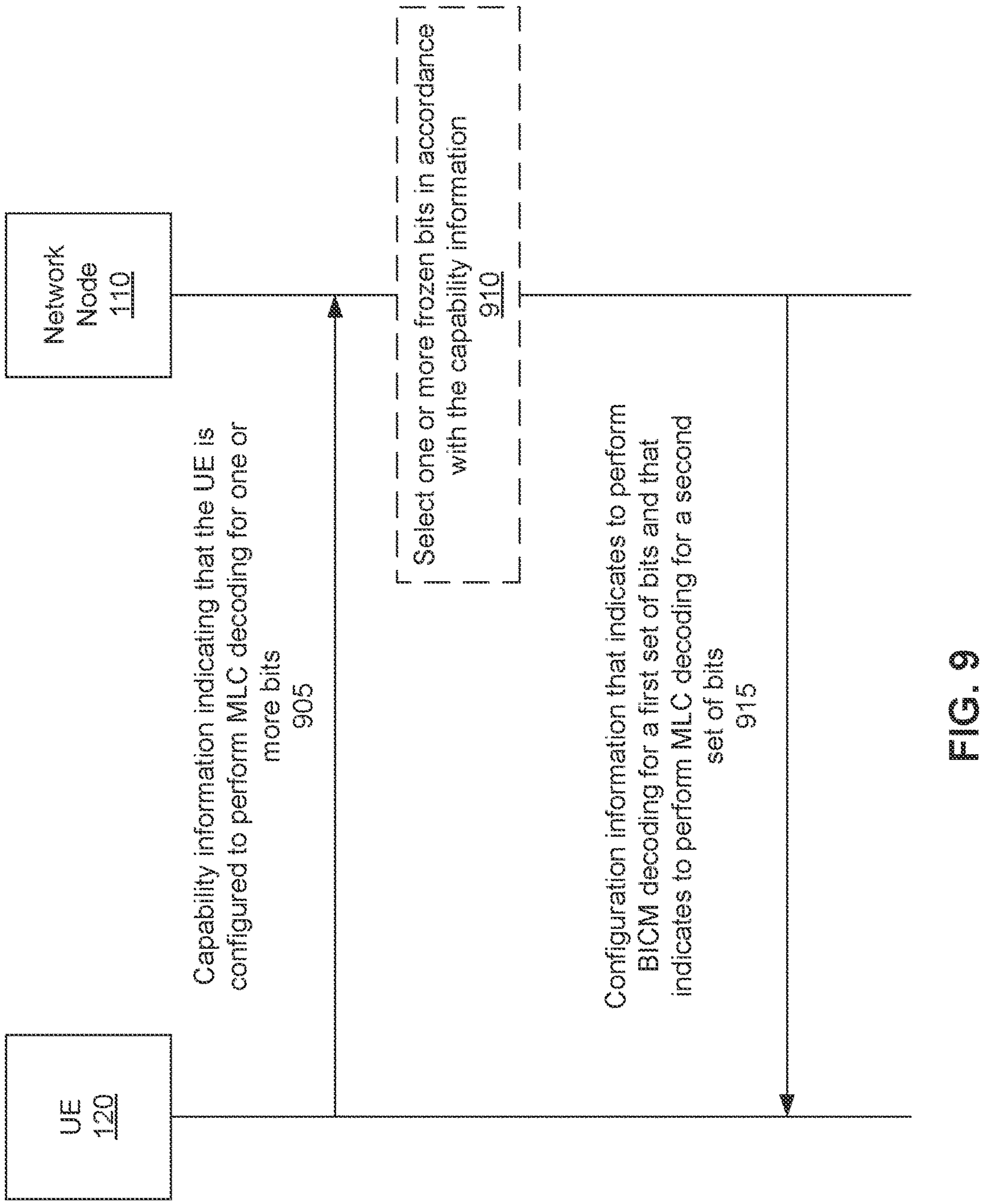
FIG. 9 is a diagram illustrating an example of joint multi-level coding and bit-interleaved coded modulation, in accordance with the present disclosure.

FIG. 9 is a diagram illustrating an example 900 of joint multi-level coding and bit-interleaved coded modulation, in accordance with the present disclosure. A UE (such as the UE 120) and a network node (such as the network node 110) may dynamically switch between BICM with gray labeling and MLC with SP labeling to improve performance and reduce complexity. In some aspects, the UE 120 and/or the network node 110 may obtain an indication of a combination of a polar code, a constellation, and/or a labeling that supports switching between the BICM with gray labeling and the MLC with SP labeling.

As shown by reference number 905, the UE 120 may transmit, and the network node 110 may receive, capability information indicating that the UE is configured to perform MLC decoding for one or more bits of a plurality of constellation bits. In one example, for 16 quadrature amplitude modulation (QAM), the UE 120 may indicate for which bits the UE 120 is to use MLC decoding. For example, the UE 120 may transmit "0011" to indicate that the UE 120 is to use MLC decoding only for the last two bits. In this example, the UE 120 may transmit a plurality of bits, where a value of 0 for a bit indicates that the UE 120 is to perform BICM (with gray labeling) and a value of 1 indicates that the UE 120 is to perform MLC (with SP labeling). The UE 120 may perform BICM decoding for the first two bits, and may generate a log-likelihood ratio (LLR) for the remaining two bits for subsequent MLC decoder iterations.

As shown by reference number 910, the network node 110 may select one or more frozen bits in accordance with the capability information. For example, the network node 110 may select a frozen bit table from a plurality of frozen bit tables configured at the network node 110 (and/or the UE 120) based at least in part on the capability information.

As shown by reference number 915, the network node 110 may transmit, and the UE 120 may receive, configuration information that indicates for the UE 120 to perform BICM decoding for a first set of bits and that indicates to perform MLC decoding for a second set of bits. In some aspects, transmitting the capability information may include transmitting radio resource control (RRC) information, a medium access control (MAC) control element (MAC-CE), or downlink control information (DCI) that includes the capability information. For example, the network node may transmit RRC information, a MAC-CE, or DCI that includes one bit indicating which frozen bit table is to be used by the network node 110 (e.g., all BICM or all MLC). The UE 120 may adjust a mapping or a decoding scheme in accordance with receiving the configuration information from the network node 110.

In some aspects, the network node 110 may signal a quantity of bits that support the joint BICM and MLC schemes. In one example, the quantity of bits may be in accordance with ceil (log 2 (m))+1, where m is the quantity of constellation bits. In some aspects, a first bit of the quantity of bits may indicate whether or not the joint BICM and MLC scheme is used. For example, a value of 0 may indicate that the joint BICM and MLC scheme is not used, while a value of 1 may indicate that the joint BICM and MLC scheme is used. The remaining bits may indicate on which constellation bits the switching from BICM to MLC is to be performed. In some other aspects, signaling may be further reduced by using either a joint BICM and MLC approach or a non-joint BICM and MLC approach. In this example, the signaling size may be ceil (log 2 (m+1)) and the switching bit can be the first bit (for example, only MLC (0 index) until m (only BICM)). In some aspects, the network node 110 may transmit, and the UE 120 may receive, a PDSCH communication in accordance with the configuration information. In some examples, the configuration may be per-codebook of a plurality of codebooks, per-codebookgroup of a plurality of codebook groups, or per-slot of a plurality of slots, among other examples.

As indicated above, FIG. 9 is provided as an example. Other examples may differ from what is described with regard to FIG. 9.

Figure 10:
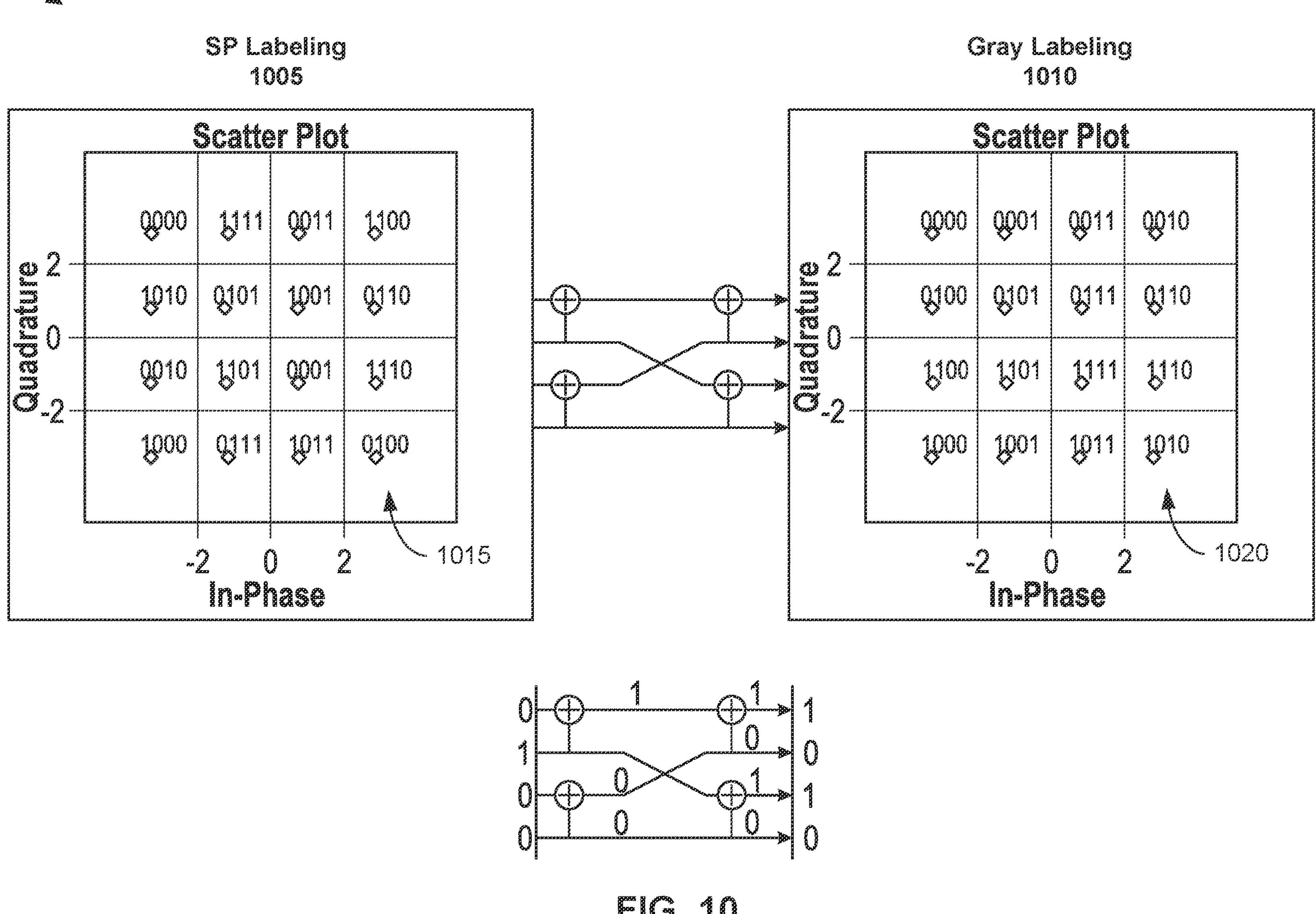
FIG. 10 is a diagram illustrating an example of set partitioning gray labeling, in accordance with the present disclosure.

FIG. 10 is a diagram illustrating an example 1000 of set partitioning gray labeling, in accordance with the present disclosure. In some cases, SP labeling may be converted into gray labeling. In one example, a 16 QAM SP labeling scheme 1005 may be converted into a 16 QAM gray labeling scheme 1010 with a regular [u+v,v] polar code size of four. For example, as shown by reference number 1015, if an input word "0100" is encoded with a polar code size of four, then, as shown by reference number 1020, a word "1010" may be output. This may be true for all sixteen combinations of the constellation, where 16 QAM SP labeling is converted into gray labeling after a polar encoding with N=4.

As indicated above, FIG. 10 is provided as an example. Other examples may differ from what is described with regard to FIG. 10.

Figure 11:
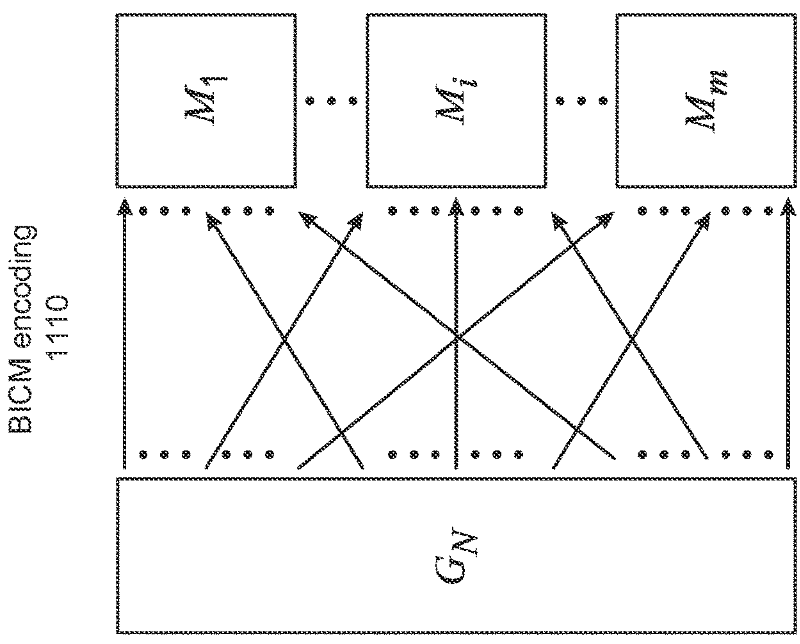
FIG. 11 is a diagram illustrating an example of encoding for joint multi-level coding and bit-interleaved coded modulation, in accordance with the present disclosure.
Figure 11:
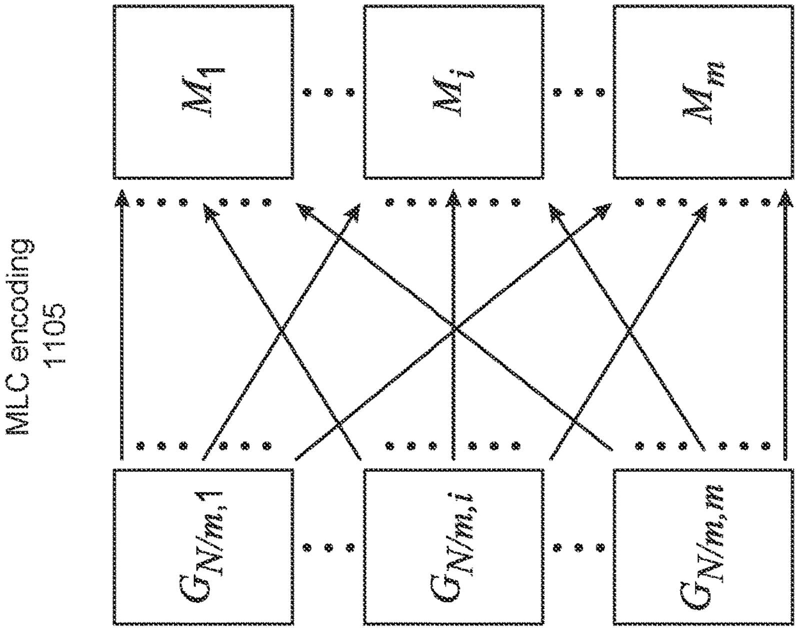

FIG. 11 is a diagram illustrating an example 1100 of encoding for joint multi-level coding and bit-interleaved coded modulation, in accordance with the present disclosure. In an example where inner codes are able to be transformed from gray labeling to SP labeling (e.g., as described in connection with FIG. 10), a process for encoding polar codes using MLC encoding 1105 may be the same as a process for encoding polar codes using BICM encoding 1110. In some cases, there may be a difference in the frozen bit set; however, this does not influence the encoding process. A single encoder scheme may be configured to support BICM and MLC, and/or to support joint BICM and MLC, which is an advantage over encoding schemes that can only support BICM or MLC (thereby requiring different encoders and different labeling, among other examples). In some cases, an encoder scheme that is suitable to MLC may be used for BICM to save complexity, for example, where the encoding complexity of a polar code is $O(n \cdot \log(n))$ and MLC scheme encoding complexity is $$4 \cdot \frac{n}{4} \cdot \log\left(\frac{n}{4}\right) = n \cdot \log\left(\frac{n}{4}\right),$$

which is lower than the regular BICM complexity of $n \cdot \log(n)$.

As indicated above, FIG. 11 is provided as an example. Other examples may differ from what is described with regard to FIG. 11.

Figure 12:
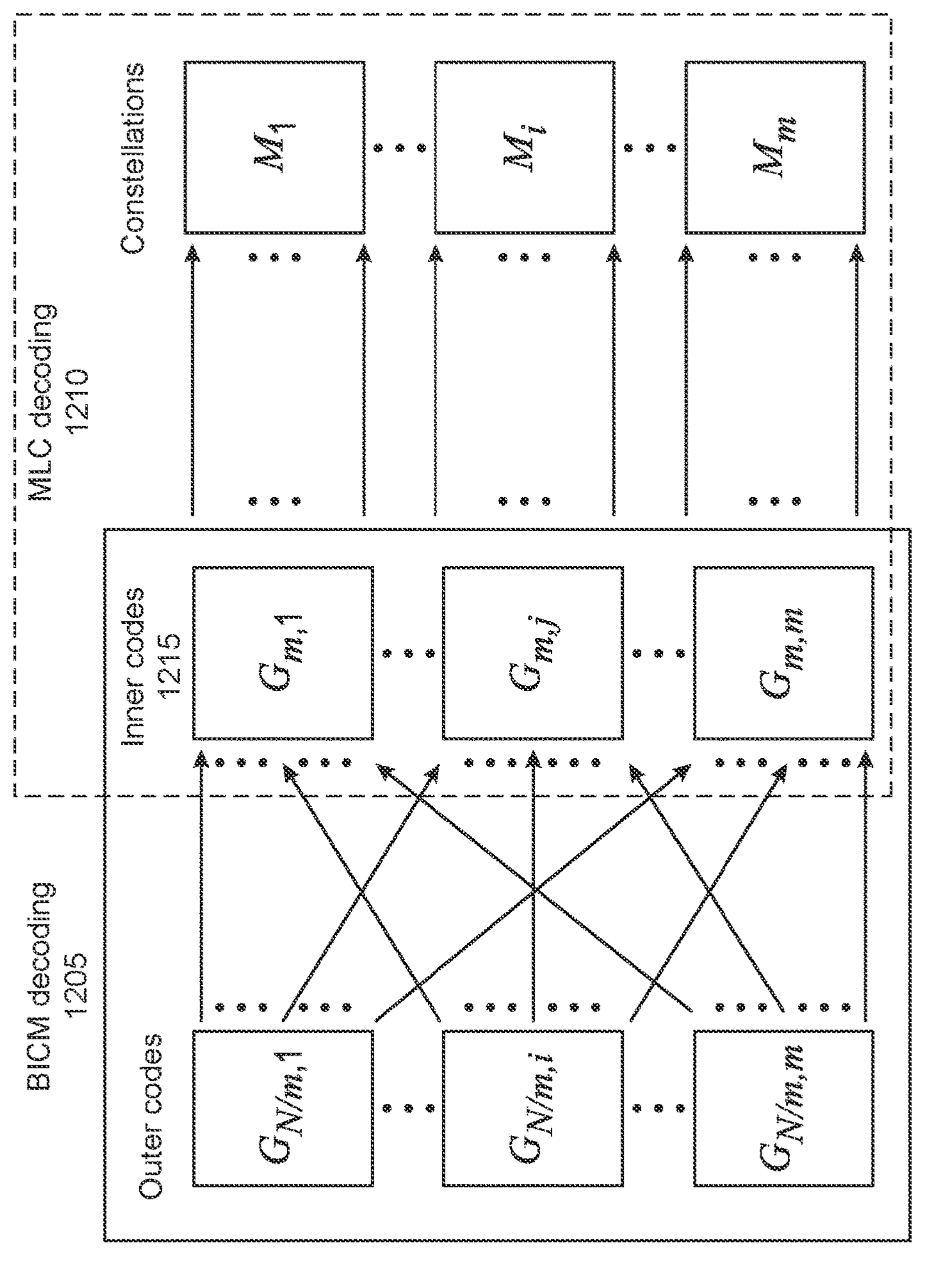
FIG. 12 is a diagram illustrating an example of decoding for joint multi-level coding and bit-interleaved coded modulation, in accordance with the present disclosure.

FIG. 12 is a diagram illustrating an example 1200 of decoding for joint multi-level coding and bit-interleaved coded modulation, in accordance with the present disclosure. As described herein, BICM and MLC may be the same when an inner code of size m (e.g., the constellation size) transforms SP labeling into gray labeling. From a decoding perspective, for BICM decoding 1205 and MLC decoding 1210, inner codes 1215 may be considered as a part of the code, which may result in a BICM scheme with gray labeling. Additionally, or alternatively, the inner codes 1215 may be considered part of the constellation, which may result in an MLC scheme with SP labeling. In each case (e.g., BICM or MLC), a different set of frozen bits may need to be used. In some cases, this may be considered per-bit (e.g., for each bit) in order to improve performance and reduce complexity. For example, BICM with gray labeling may be used for the first two bits (e.g., to reduce complexity where polarization is better) and MLC with SP may be used for the last two bits. For improved performance, the frozen bits may be selected in accordance with this information.

As indicated above, FIG. 12 is provided as an example. Other examples may differ from what is described with regard to FIG. 12.

Figure 13:
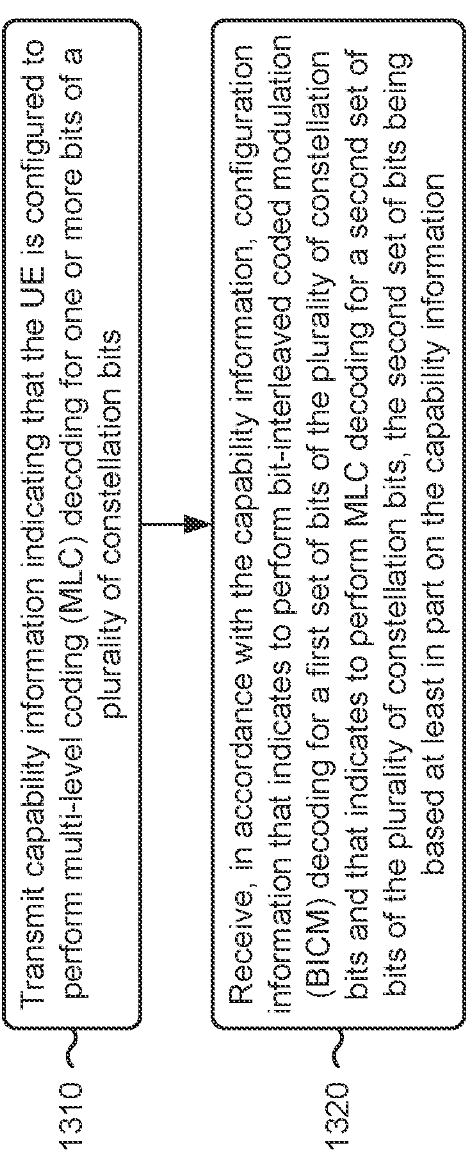
FIG. 13 is a diagram illustrating an example process performed, for example, at a UE or an apparatus of a UE, in accordance with the present disclosure.
Figure 13:

FIG. 13 is a diagram illustrating an example process 1300 performed, for example, at a UE or an apparatus of a UE, in accordance with the present disclosure. Example process 1300 is an example where the apparatus or the UE (e.g., UE 120) performs operations associated with multi-level coding and bit-interleaved coded modulation.

As shown in FIG. 13, in some aspects, process 1300 may include transmitting capability information indicating that the UE is configured to perform MLC decoding for one or more bits of a plurality of constellation bits (block 1310). For example, the UE (e.g., using transmission component 1504 and/or communication manager 1506, depicted in FIG. 15) may transmit capability information indicating that the UE is configured to perform MLC decoding for one or more bits of a plurality of constellation bits, as described above.

As further shown in FIG. 13, in some aspects, process 1300 may include receiving, in accordance with the capability information, configuration information that indicates to perform BICM decoding for a first set of bits of the plurality of constellation bits and that indicates to perform MLC decoding for a second set of bits of the plurality of constellation bits, the second set of bits being based at least in part on the capability information (block 1320). For example, the UE (e.g., using reception component 1502 and/or communication manager 1506, depicted in FIG. 15) may receive, in accordance with the capability information, configuration information that indicates to perform BICM decoding for a first set of bits of the plurality of constellation bits and that indicates to perform MLC decoding for a second set of bits of the plurality of constellation bits, the second set of bits being based at least in part on the capability information, as described above.

Process 1300 may include additional aspects, such as any single aspect or any combination of aspects described below and/or in connection with one or more other processes described elsewhere herein.

In a first aspect, the BICM decoding is BICM decoding with gray labeling and the MLC decoding is MLC decoding with set partitioning labeling.

In a second aspect, alone or in combination with the first aspect, process 1300 includes obtaining an indication that a polar code, a constellation type, and a labeling type support BICM decoding for the first set of bits and MLC decoding for the second set of bits.

In a third aspect, alone or in combination with one or more of the first and second aspects, transmitting the capability information comprises transmitting a plurality of capability information bits, wherein a first value of a bit of the plurality of capability information bits indicates that the UE is not configured to perform MLC decoding associated with the bit and a second value of the bit of the plurality of capability information bits indicates that the UE is configured to perform MLC decoding associated with the bit.

In a fourth aspect, alone or in combination with one or more of the first through third aspects, the configuration information is associated with one or more frozen bits, each frozen bit of the one or more frozen bits having a value that is configured at the UE and configured at a network node.

In a fifth aspect, alone or in combination with one or more of the first through fourth aspects, receiving the configuration information comprises receiving a radio resource control message, a medium access control message, or downlink control information that includes the configuration information.

In a sixth aspect, alone or in combination with one or more of the first through fifth aspects, receiving the configuration information comprises receiving a configuration bit that indicates a frozen bit table associated with BICM decoding or MLC decoding.

In a seventh aspect, alone or in combination with one or more of the first through sixth aspects, process 1300 includes transmitting, in accordance with the configuration bit, at least one of mapping information or decoding scheme information associated with performing the BICM decoding or the MLC decoding.

In an eighth aspect, alone or in combination with one or more of the first through seventh aspects, receiving the configuration information comprises receiving a plurality of configuration information bits that indicate for the UE to perform joint BICM and MLC decoding, wherein the joint BICM and MLC decoding includes BICM decoding for a first set of bits of the plurality of constellation bits and MLC decoding for a second set of bits of the plurality of constellation bits.

In a ninth aspect, alone or in combination with one or more of the first through eighth aspects, a first configuration information bit of the plurality of configuration information bits indicates to use the joint BICM and MLC decoding, and one or more other configuration information bits of the plurality of configuration information bits indicate a constellation bit associated with switching from performing BICM decoding to performing MLC decoding.

In a tenth aspect, alone or in combination with one or more of the first through ninth aspects, a first configuration information bit of the plurality of configuration information bits indicates a constellation bit associated with switching from performing BICM decoding to performing MLC decoding.

In an eleventh aspect, alone or in combination with one or more of the first through tenth aspects, process 1300 includes transmitting other capability information indicating that the UE supports receiving the configuration information that includes the plurality of configuration information bits.

In a twelfth aspect, alone or in combination with one or more of the first through eleventh aspects, process 1300 includes receiving a physical downlink shared channel communication in accordance with the configuration information.

In a thirteenth aspect, alone or in combination with one or more of the first through twelfth aspects, a set of frozen bits associated with the BICM decoding is different than a set of frozen bits associated with the MLC decoding.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
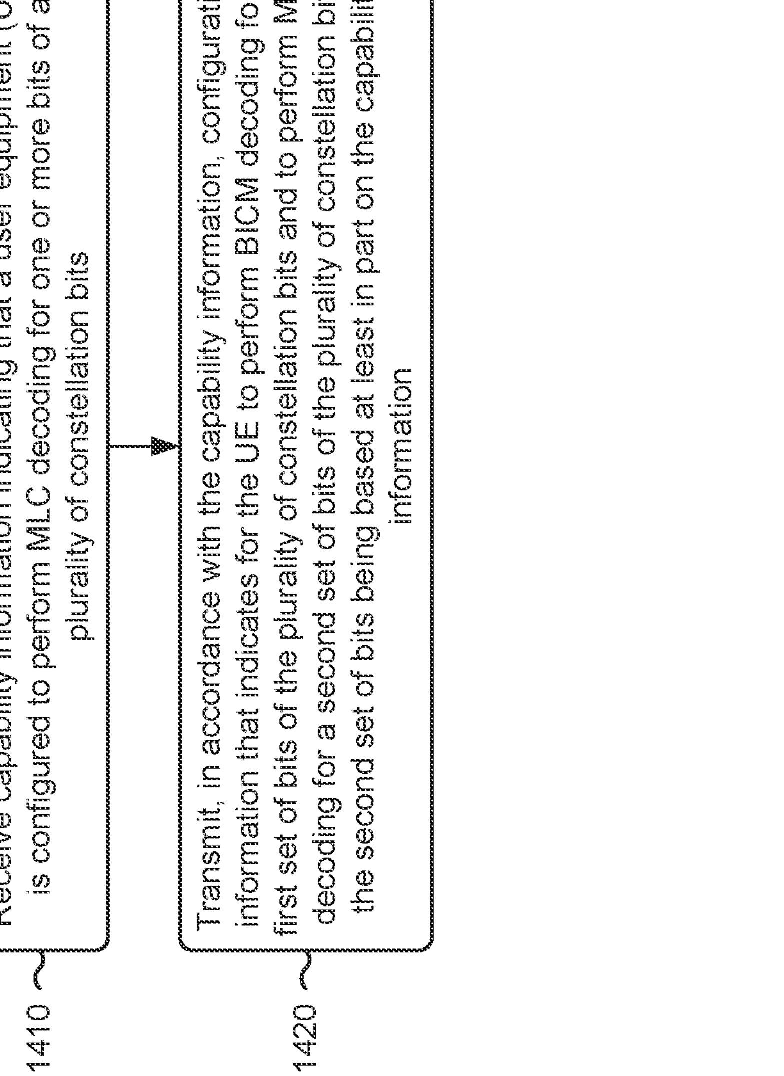
FIG. 14 is a diagram illustrating an example process performed, for example, at a network node or an apparatus of a network node, in accordance with the present disclosure.

FIG. 14 is a diagram illustrating an example process 1400 performed, for example, at a network node or an apparatus of a network node, in accordance with the present disclosure. Example process 1400 is an example where the apparatus or the network node (e.g., network node 110) performs operations associated with multi-level coding and bit-interleaved coded modulation.

As shown in FIG. 14, in some aspects, process 1400 may include receiving capability information indicating that a UE is configured to perform MLC decoding for one or more bits of a plurality of constellation bits (block 1410). For example, the network node (e.g., using reception component 1602 and/or communication manager 1606, depicted in FIG. 16) may receive capability information indicating that a UE is configured to perform MLC decoding for one or more bits of a plurality of constellation bits, as described above.

As further shown in FIG. 14, in some aspects, process 1400 may include transmitting, in accordance with the capability information, configuration information that indicates for the UE to perform BICM decoding for a first set of bits of the plurality of constellation bits and to perform MLC decoding for a second set of bits of the plurality of constellation bits, the second set of bits being based at least in part on the capability information (block 1420). For example, the network node (e.g., using transmission component 1604 and/or communication manager 1606, depicted in FIG. 16) may transmit, in accordance with the capability information, configuration information that indicates for the UE to perform BICM decoding for a first set of bits of the plurality of constellation bits and to perform MLC decoding for a second set of bits of the plurality of constellation bits, the second set of bits being based at least in part on the capability information, as described above.

Process 1400 may include additional aspects, such as any single aspect or any combination of aspects described below and/or in connection with one or more other processes described elsewhere herein.

In a first aspect, the BICM decoding is BICM decoding with gray labeling and the MLC decoding is MLC decoding with set partitioning labeling.

In a second aspect, alone or in combination with the first aspect, process 1400 includes obtaining an indication that a polar code, a constellation type, and a labeling type support BICM decoding for the first set of bits and MLC decoding for the second set of bits.

In a third aspect, alone or in combination with one or more of the first and second aspects, receiving the capability information comprises receiving a plurality of capability information bits, wherein a first value of a bit of the plurality of capability information bits indicates that the UE is not configured to perform MLC decoding associated with the bit and a second value of the bit of the plurality of capability information bits indicates that the UE is configured to perform MLC decoding associated with the bit.

In a fourth aspect, alone or in combination with one or more of the first through third aspects, process 1400 includes selecting one or more frozen bits in accordance with a frozen bit table and in accordance with the capability information, each frozen bit of the one or more frozen bits having a value that is configured at the UE and configured at the network node.

In a fifth aspect, alone or in combination with one or more of the first through fourth aspects, transmitting the configuration information comprises transmitting a radio resource control message, a medium access control message, or downlink control information that includes the configuration information.

In a sixth aspect, alone or in combination with one or more of the first through fifth aspects, transmitting the configuration information comprises transmitting a configuration bit that indicates a frozen bit table associated with BICM decoding or MLC decoding.

In a seventh aspect, alone or in combination with one or more of the first through sixth aspects, process 1400 includes receiving, in accordance with the configuration bit, at least one of mapping information or decoding scheme information associated with the BICM decoding or the MLC decoding.

In an eighth aspect, alone or in combination with one or more of the first through seventh aspects, transmitting the configuration information comprises transmitting a plurality of configuration information bits that indicate for the UE to perform joint BICM and MLC decoding, wherein the joint BICM and MLC decoding includes BICM decoding for a first set of bits of the plurality of constellation bits and MLC decoding for a second set of bits of the plurality of constellation bits.

In a ninth aspect, alone or in combination with one or more of the first through eighth aspects, a first configuration information bit of the plurality of configuration information bits indicates to use the joint BICM and MLC decoding, and one or more other configuration information bits of the plurality of configuration information bits indicate a constellation bit associated with switching from performing BICM decoding to performing MLC decoding.

In a tenth aspect, alone or in combination with one or more of the first through ninth aspects, a first configuration information bit of the plurality of configuration information bits indicates a constellation bit associated with switching from performing BICM decoding to performing MLC decoding.

In an eleventh aspect, alone or in combination with one or more of the first through tenth aspects, process 1400 includes receiving other capability information indicating that the UE supports the configuration information that includes the plurality of configuration information bits.

In a twelfth aspect, alone or in combination with one or more of the first through eleventh aspects, process 1400 includes transmitting a physical downlink shared channel communication in accordance with the configuration information.

In a thirteenth aspect, alone or in combination with one or more of the first through twelfth aspects, a set of frozen bits associated with the BICM decoding is different than a set of frozen bits associated with the MLC decoding.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
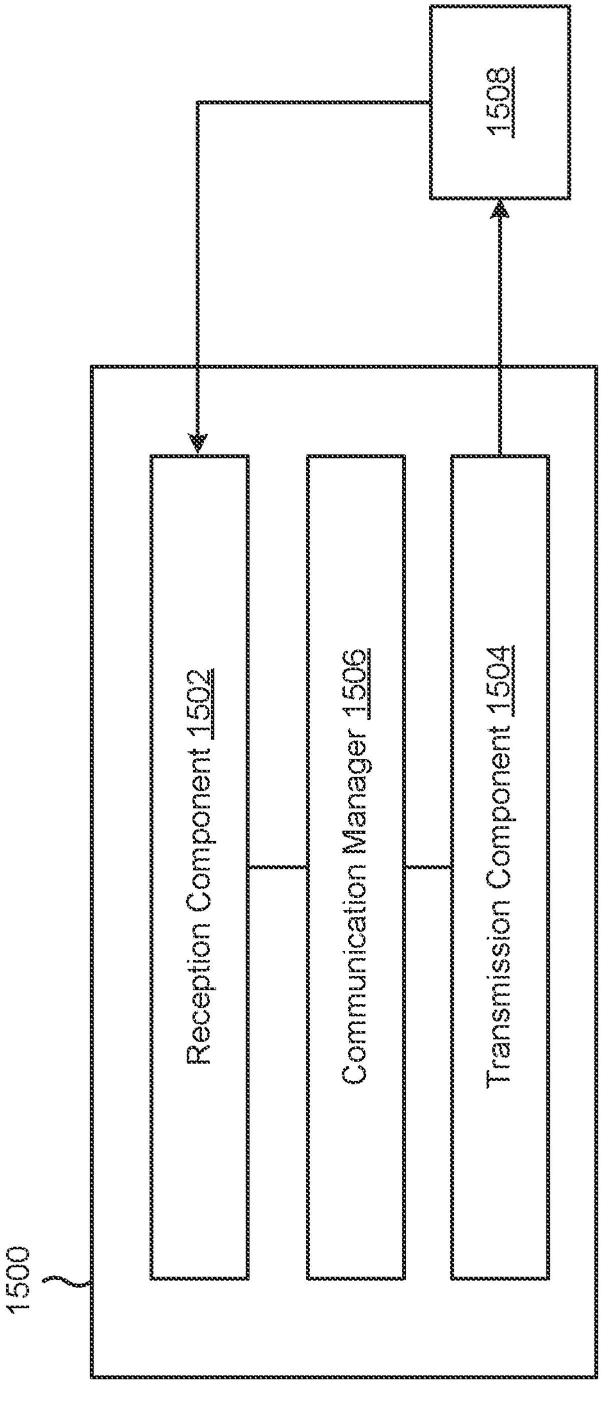
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a UE, or a UE may include the apparatus 1500. In some aspects, the apparatus 1500 includes a reception component 1502, a transmission component 1504, and/or a communication manager 1506, which may be in communication with one another (for example, via one or more buses and/or one or more other components). In some aspects, the communication manager 1506 is the communication manager 140 described in connection with FIG. 1. As shown, the apparatus 1500 may communicate with another apparatus 1508, such as a UE or a network node (such as a CU, a DU, an RU, or a base station), using the reception component 1502 and the transmission component 1504.

In some aspects, the apparatus 1500 may be configured to perform one or more operations described herein in connection with FIGS. 9-12. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1504 may be co-located with the reception component 1502 in one or more transceivers.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

The transmission component 1504 may transmit capability information indicating that the UE is configured to perform MLC decoding for one or more bits of a plurality of constellation bits. The reception component 1502 may receive, in accordance with the capability information, configuration information that indicates to perform BICM decoding for a first set of bits of the plurality of constellation bits and that indicates to perform MLC decoding for a second set of bits of the plurality of constellation bits, the second set of bits being based at least in part on the capability information.

The reception component 1502 may obtain an indication that a polar code, a constellation type, and a labeling type support BICM decoding for the first set of bits and MLC decoding for the second set of bits. The transmission component 1504 may transmit, in accordance with the configuration bit, at least one of mapping information or decoding scheme information associated with performing the BICM decoding or the MLC decoding. The transmission component 1504 may transmit other capability information indicating that the UE supports receiving the configuration information that includes the plurality of configuration information bits. The reception component 1502 may receive a physical downlink shared channel communication in accordance with the configuration information.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
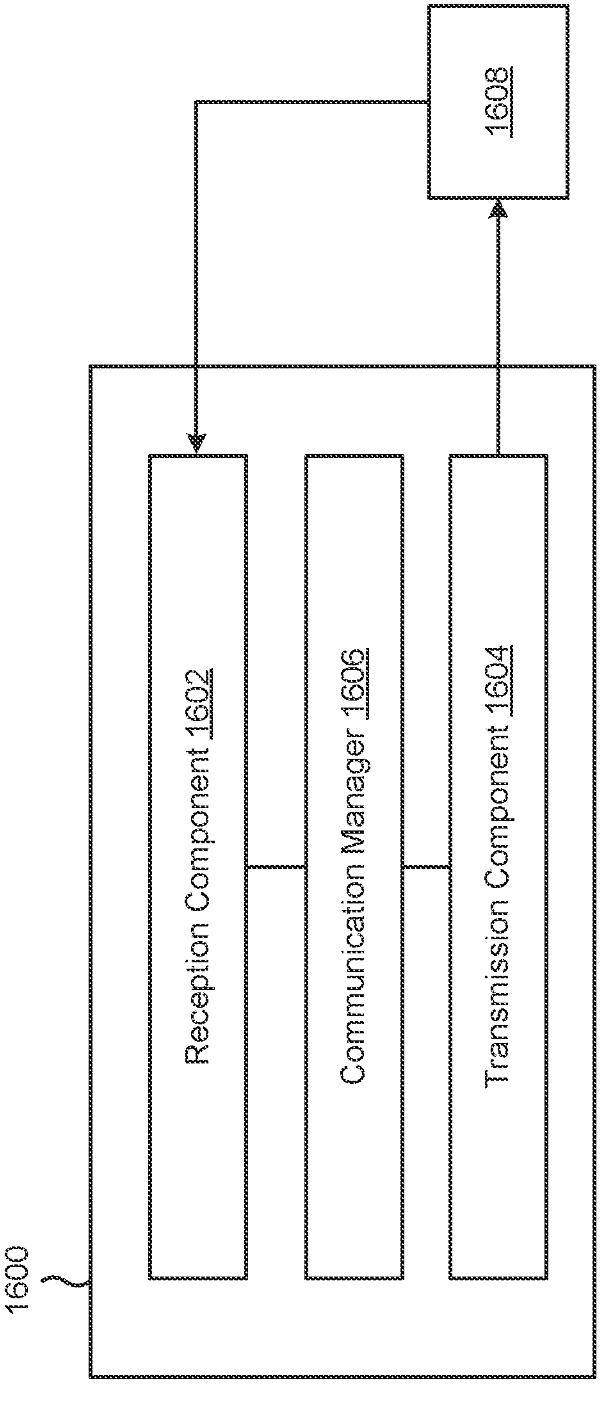
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a network node, or a network node may include the apparatus 1600. In some aspects, the apparatus 1600 includes a reception component 1602, a transmission component 1604, and/or a communication manager 1606, which may be in communication with one another (for example, via one or more buses and/or one or more other components). In some aspects, the communication manager 1606 is the communication manager 150 described in connection with FIG. 1. As shown, the apparatus 1600 may communicate with another apparatus 1608, such as a UE or a network node (such as a CU, a DU, an RU, or a base station), using the reception component 1602 and the transmission component 1604.

In some aspects, the apparatus 1600 may be configured to perform one or more operations described herein in connection with FIGS. 9-12. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1602 may receive communications, such as reference signals, control information, data communications, or a combination thereof, from the apparatus 1608. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1602 and/or the transmission component 1604 may include or may be included in a network interface. The network interface may be configured to obtain and/or output signals for the apparatus 1600 via one or more communications links, such as a backhaul link, a midhaul link, and/or a fronthaul link.

The transmission component 1604 may transmit communications, such as reference signals, control information, data communications, or a combination thereof, to the apparatus 1608. In some aspects, one or more other components of the apparatus 1600 may generate communications and may provide the generated communications to the transmission component 1604 for transmission to the apparatus 1608. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1604 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1604 may be co-located with the reception component 1602 in one or more transceivers.

The communication manager 1606 may support operations of the reception component 1602 and/or the transmission component 1604. For example, the communication manager 1606 may receive information associated with configuring reception of communications by the reception component 1602 and/or transmission of communications by the transmission component 1604. Additionally, or alternatively, the communication manager 1606 may generate and/or provide control information to the reception component 1602 and/or the transmission component 1604 to control reception and/or transmission of communications.

The reception component 1602 may receive capability information indicating that a UE is configured to perform MLC decoding for one or more bits of a plurality of constellation bits. The transmission component 1604 may transmit, in accordance with the capability information, configuration information that indicates for the UE to perform BICM decoding for a first set of bits of the plurality of constellation bits and to perform MLC decoding for a second set of bits of the plurality of constellation bits, the second set of bits being based at least in part on the capability information.

The reception component 1602 may obtain an indication that a polar code, a constellation type, and a labeling type support BICM decoding for the first set of bits and MLC decoding for the second set of bits. The communication manager 1606 may select one or more frozen bits in accordance with a frozen bit table and in accordance with the capability information, each frozen bit of the one or more frozen bits having a value that is configured at the UE and configured at the network node. The reception component 1602 may receive, in accordance with the configuration bit, at least one of mapping information or decoding scheme information associated with the BICM decoding or the MLC decoding. The reception component 1602 may receive other capability information indicating that the UE supports the configuration information that includes the plurality of configuration information bits. The transmission component 1604 may transmit a physical downlink shared channel communication in accordance with the configuration information.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: transmitting capability information indicating that the UE is configured to perform multi-level coding (MLC) decoding for one or more bits of a plurality of constellation bits; and receiving, in accordance with the capability information, configuration information that indicates to perform bit-interleaved coded modulation (BICM) decoding for a first set of bits of the plurality of constellation bits and that indicates to perform MLC decoding for a second set of bits of the plurality of constellation bits, the second set of bits being based at least in part on the capability information.

Aspect 2: The method of Aspect 1, wherein the BICM decoding is BICM decoding with gray labeling and the MLC decoding is MLC decoding with set partitioning labeling.

Aspect 3: The method of any of Aspects 1-2, further comprising obtaining an indication that a polar code, a constellation type, and a labeling type support BICM decoding for the first set of bits and MLC decoding for the second set of bits.

Aspect 4: The method of any of Aspects 1-3, wherein transmitting the capability information comprises transmitting a plurality of capability information bits, wherein a first value of a bit of the plurality of capability information bits indicates that the UE is not configured to perform MLC decoding associated with the bit and a second value of the bit of the plurality of capability information bits indicates that the UE is configured to perform MLC decoding associated with the bit.

Aspect 5: The method of any of Aspects 1-4, wherein the configuration information is associated with one or more frozen bits, each frozen bit of the one or more frozen bits having a value that is configured at the UE and configured at a network node.

Aspect 6: The method of any of Aspects 1-5, wherein receiving the configuration information comprises receiving a radio resource control message, a medium access control message, or downlink control information that includes the configuration information.

Aspect 7: The method of any of Aspects 1-6, wherein receiving the configuration information comprises receiving a configuration bit that indicates a frozen bit table associated with BICM decoding or MLC decoding.

Aspect 8: The method of Aspect 7, further comprising transmitting, in accordance with the configuration bit, at least one of mapping information or decoding scheme information associated with performing the BICM decoding or the MLC decoding.

Aspect 9: The method of any of Aspects 1-8, wherein receiving the configuration information comprises receiving a plurality of configuration information bits that indicate for the UE to perform joint BICM and MLC decoding, wherein the joint BICM and MLC decoding includes BICM decoding for a first set of bits of the plurality of constellation bits and MLC decoding for a second set of bits of the plurality of constellation bits.

Aspect 10: The method of Aspect 9, wherein a first configuration information bit of the plurality of configuration information bits indicates to use the joint BICM and MLC decoding, and wherein one or more other configuration information bits of the plurality of configuration information bits indicate a constellation bit associated with switching from performing BICM decoding to performing MLC decoding.

Aspect 11: The method of Aspect 9, wherein a first configuration information bit of the plurality of configuration information bits indicates a constellation bit associated with switching from performing BICM decoding to performing MLC decoding.

Aspect 12: The method of any of Aspects 1-11, further comprising receiving a physical downlink shared channel communication in accordance with the configuration information.

Aspect 13: The method of any of Aspects 1-12, wherein the configuration information is indicated for each codebook of a plurality of codebooks, for each codebook group of a plurality of codebook groups, or for each slot of a plurality of slots.

Aspect 14: The method of any of Aspects 1-13, wherein a set of frozen bits associated with the BICM decoding is different than another set of frozen bits associated with the MLC decoding, and wherein each combination of BICM and MLC decoding, of a plurality of combinations of BICM and MLC decoding, is associated with a respective set of frozen bits that is different than the set of frozen bits associated with the BICM decoding and the other set of frozen bits associated with the MLC decoding.

Aspect 15: A method of wireless communication performed by a network node, comprising: receiving capability information indicating that a user equipment (UE) is configured to perform multi-level coding (MLC) decoding for one or more bits of a plurality of constellation bits; and transmitting, in accordance with the capability information, configuration information that indicates for the UE to perform bit-interleaved coded modulation (BICM) decoding for a first set of bits of the plurality of constellation bits and to perform MLC decoding for a second set of bits of the plurality of constellation bits, the second set of bits being based at least in part on the capability information.

Aspect 16: The method of Aspect 15, wherein the BICM decoding is BICM decoding with gray labeling and the MLC decoding is MLC decoding with set partitioning labeling.

Aspect 17: The method of any of Aspects 15-16, further comprising obtaining an indication that a polar code, a constellation type, and a labeling type support BICM decoding for the first set of bits and MLC decoding for the second set of bits.

Aspect 18: The method of any of Aspects 15-17, wherein receiving the capability information comprises receiving a plurality of capability information bits, wherein a first value of a bit of the plurality of capability information bits indicates that the UE is not configured to perform MLC decoding associated with the bit and a second value of the bit of the plurality of capability information bits indicates that the UE is configured to perform MLC decoding associated with the bit.

Aspect 19: The method of any of Aspects 15-18, further comprising selecting one or more frozen bits in accordance with a frozen bit table and in accordance with the capability information, each frozen bit of the one or more frozen bits having a value that is configured at the UE and configured at the network node.

Aspect 20: The method of any of Aspects 15-19, wherein transmitting the configuration information comprises transmitting a radio resource control message, a medium access control message, or downlink control information that includes the configuration information.

Aspect 21: The method of any of Aspects 15-20, wherein transmitting the configuration information comprises transmitting a configuration bit that indicates a frozen bit table associated with BICM decoding or MLC decoding.

Aspect 22: The method of Aspect 21, further comprising receiving, in accordance with the configuration bit, at least one of mapping information or decoding scheme information associated with the BICM decoding or the MLC decoding.

Aspect 23: The method of any of Aspects 15-22, wherein transmitting the configuration information comprises transmitting a plurality of configuration information bits that indicate for the UE to perform joint BICM and MLC decoding, wherein the joint BICM and MLC decoding includes BICM decoding for a first set of bits of the plurality of constellation bits and MLC decoding for a second set of bits of the plurality of constellation bits.

Aspect 24: The method of Aspect 23, wherein a first configuration information bit of the plurality of configuration information bits indicates to use the joint BICM and MLC decoding, and wherein one or more other configuration information bits of the plurality of configuration information bits indicate a constellation bit associated with switching from performing BICM decoding to performing MLC decoding.

Aspect 25: The method of Aspect 23, wherein a first configuration information bit of the plurality of configuration information bits indicates a constellation bit associated with switching from performing BICM decoding to performing MLC decoding.

Aspect 26: The method of any of Aspects 15-25, further comprising transmitting a physical downlink shared channel communication in accordance with the configuration information.

Aspect 28: The method of any of Aspects 15-26, wherein the configuration information is indicated for each codebook of a plurality of codebooks, for each codebook group of a plurality of codebook groups, or for each slot of a plurality of slots.

Aspect 28: The method of any of Aspects 15-27, wherein a set of frozen bits associated with the BICM decoding is different than another set of frozen bits associated with the MLC decoding, and wherein each combination of BICM and MLC decoding, of a plurality of combinations of BICM and MLC decoding, is associated with a respective set of frozen bits that is different than the set of frozen bits associated with the BICM decoding and the other set of frozen bits associated with the MLC decoding.

Aspect 29: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-28.

Aspect 30: An apparatus for wireless communication at a device, the apparatus comprising one or more memories and one or more processors coupled to the one or more memories, the one or more processors configured to cause the device to perform the method of one or more of Aspects 1-28.

Aspect 31: An apparatus for wireless communication, the apparatus comprising at least one means for performing the method of one or more of Aspects 1-28.

Aspect 32: A non-transitory computer-readable medium storing code for wireless communication, the code comprising instructions executable by one or more processors to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

Aspect 34: A device for wireless communication, the device comprising a processing system that includes one or more processors and one or more memories coupled with the one or more processors, the processing system configured to cause the device to perform the method of one or more of Aspects 1-28.

Aspect 35: An apparatus for wireless communication at a device, the apparatus comprising one or more memories and one or more processors coupled to the one or more memories, the one or more processors individually or collectively configured to cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to cause the UE to:

transmit capability information indicating that the UE is configured to perform multi-level coding (MLC) decoding for one or more bits of a plurality of constellation bits, wherein the one or more processors, to cause the UE to transmit the capability information, are configured to cause the UE to transmit a plurality of capability information bits, wherein a first value of a bit of the plurality of capability information bits indicates that the UE is not configured to perform MLC decoding associated with the bit or a second value of the bit indicates that the UE is configured to perform the MLC decoding associated with the bit; and receive, in accordance with the capability information, configuration information that indicates to perform bit-interleaved coded modulation (BICM) decoding for a first set of bits of the plurality of constellation bits and that indicates to perform MLC decoding for a second set of bits of the plurality of constellation bits, the second set of bits being based at least in part on the capability information.

2. The apparatus of claim 1, wherein the BICM decoding for the first set of bits is BICM decoding with gray labeling.

3. The apparatus of claim 1, wherein the one or more processors are further configured to cause the UE to obtain an indication that a polar code, a constellation type, and a labeling type support the BICM decoding for the first set of bits and the MLC decoding for the second set of bits.

4. The apparatus of claim 1, wherein the MLC decoding for the second set of bits is MLC decoding with set partitioning labeling.

5. The apparatus of claim 1, wherein the configuration information is associated with one or more frozen bits, each frozen bit of the one or more frozen bits having a value that is configured at the UE and configured at a network node.

6. The apparatus of claim 1, wherein the one or more processors, to cause the UE to receive the configuration information, are configured to cause the UE to receive a radio resource control message, a medium access control message, or downlink control information that includes the configuration information.

7. The apparatus of claim 1, wherein the one or more processors, to cause the UE to receive the configuration information, are configured to cause the UE to receive a configuration bit that indicates a frozen bit table associated with the BICM decoding for the first set of bits or the MLC decoding for the second set of bits.

8. The apparatus of claim 7, wherein the one or more processors are further configured to cause the UE to transmit, in accordance with the configuration bit, at least one of mapping information or decoding scheme information associated with performing the BICM decoding for the first set of bits or the MLC decoding for the second set of bits.

9. The apparatus of claim 1, wherein the one or more processors, to receive the configuration information, are configured to cause the UE to receive a plurality of configuration information bits that indicate for the UE to perform joint BICM and MLC decoding, wherein the joint BICM and MLC decoding includes the BICM decoding for the first set of bits and the MLC decoding for the second set of bits.

10. The apparatus of claim 9, wherein a first configuration information bit of the plurality of configuration information bits indicates to use the joint BICM and MLC decoding, and wherein one or more other configuration information bits of the plurality of configuration information bits indicate a constellation bit associated with switching from performing the BICM decoding for the first set of bits to performing the MLC decoding for the second set of bits.

11. The apparatus of claim 9, wherein a first configuration information bit of the plurality of configuration information bits indicates a constellation bit associated with switching from performing the BICM decoding for the first set of bits to performing the MLC decoding for the second set of bits.

12. The apparatus of claim 1, wherein the one or more processors are further configured to cause the UE to receive a physical downlink shared channel communication in accordance with the configuration information.

13. The apparatus of claim 1, wherein the configuration information is indicated for each codebook of a plurality of codebooks, for each codebook group of a plurality of codebook groups, or for each slot of a plurality of slots.

14. The apparatus of claim 1, wherein a set of frozen bits associated with the BICM decoding for the first set of bits is different than another set of frozen bits associated with the MLC decoding for the second set of bits, and wherein each combination of BICM and MLC decoding, of a plurality of combinations of BICM and MLC decoding, is associated with a respective set of frozen bits that is different than the set of frozen bits associated with the BICM decoding for the first set of bits and the other set of frozen bits associated with the MLC decoding for the second set of bits.

15. An apparatus for wireless communication at a network node, comprising:

one or more memories; and one or more processors, coupled to the one or more memories, configured to cause the network node to:

receive capability information indicating that a user equipment (UE) is configured to perform multi-level coding (MLC) decoding for one or more bits of a plurality of constellation bits, wherein the one or more processors, to cause the network node to receive the capability information, are configured to cause the network node to receive a plurality of capability information bits, wherein a first value of a bit of the plurality of capability information bits indicates that the UE is not configured to perform MLC decoding associated with the bit or a second value of the bit indicates that the UE is configured to perform the MLC decoding associated with the bit; and transmit, in accordance with the capability information, configuration information that indicates for the UE to perform bit-interleaved coded modulation (BICM) decoding for a first set of bits of the plurality of constellation bits and to perform MLC decoding for a second set of bits of the plurality of constellation bits, the second set of bits being based at least in part on the capability information.

16. The apparatus of claim 15, wherein the BICM decoding for the first set of bits is BICM decoding with gray labeling.

17. The apparatus of claim 15, wherein the one or more processors are further configured to cause the network node to obtain an indication that a polar code, a constellation type, and a labeling type support the BICM decoding for the first set of bits and the MLC decoding for the second set of bits.

18. The apparatus of claim 15, wherein the MLC decoding for the second set of bits is MLC decoding with set partitioning labeling.

19. The apparatus of claim 15, wherein the one or more processors are further configured to cause the network node to select one or more frozen bits in accordance with a frozen bit table and in accordance with the capability information, each frozen bit of the one or more frozen bits having a value that is configured at the UE and configured at the network node.

20. The apparatus of claim 15, wherein the one or more processors, to cause the network node to transmit the configuration information, are configured to cause the network node to transmit a radio resource control message, a medium access control message, or downlink control information that includes the configuration information.

21. The apparatus of claim 15, wherein the one or more processors, to cause the network node to transmit the configuration information, are configured to cause the network node to transmit a configuration bit that indicates a frozen bit table associated with the BICM decoding for the first set of bits or the MLC decoding for the second set of bits.

22. The apparatus of claim 21, wherein the one or more processors are further configured to cause the network node to receive, in accordance with the configuration bit, at least one of mapping information or decoding scheme information associated with the BICM decoding for the first set of bits or the MLC decoding for the one or more bits.

23. The apparatus of claim 15, wherein the one or more processors, to cause the network node to transmit the configuration information, are configured to cause the network node to transmit a plurality of configuration information bits that indicate for the UE to perform joint BICM and MLC decoding, wherein the joint BICM and MLC decoding includes the BICM decoding for the first set of bits and the MLC decoding for the second set of bits.

24. The apparatus of claim 23, wherein a first configuration information bit of the plurality of configuration information bits indicates to use the joint BICM and MLC decoding, and wherein one or more other configuration information bits of the plurality of configuration information bits indicate a constellation bit associated with switching from performing the BICM decoding for the first set of bits to performing the MLC decoding for the second set of bits.

25. The apparatus of claim 23, wherein a first configuration information bit of the plurality of configuration information bits indicates a constellation bit associated with switching from performing the BICM decoding for the first set of bits to performing the MLC decoding for the second set of bits.

26. The apparatus of claim 15, wherein the one or more processors are further configured to cause the network node to transmit a physical downlink shared channel communication in accordance with the configuration information.

27. The apparatus of claim 15, wherein the configuration information is indicated for each codebook of a plurality of codebooks, for each codebook group of a plurality of codebook groups, or for each slot of a plurality of slots.

28. The apparatus of claim 15, wherein a set of frozen bits associated with the BICM decoding for the first set of bits is different than another set of frozen bits associated with the MLC decoding for the second set of bits, and wherein each combination of BICM and MLC decoding, of a plurality of combinations of BICM and MLC decoding, is associated with a respective set of frozen bits that is different than the set of frozen bits associated with the BICM decoding for the first set of bits and the other set of frozen bits associated with the MLC decoding for the second set of bits.

29. A method of wireless communication performed by a user equipment (UE), comprising:

transmitting capability information indicating that the UE is configured to perform multi-level coding (MLC) decoding for one or more bits of a plurality of constellation bits, wherein transmitting the capability information comprises transmitting a plurality of capability information bits, wherein a first value of a bit of the plurality of capability information bits indicates that the UE is not configured to perform MLC decoding associated with the bit or a second value of the bit indicates that the UE is configured to perform the MLC decoding associated with the bit; and receiving, in accordance with the capability information, configuration information that indicates to perform bit-interleaved coded modulation (BICM) decoding for a first set of bits of the plurality of constellation bits and that indicates to perform MLC decoding for a second set of bits of the plurality of constellation bits, the second set of bits being based at least in part on the capability information.

30. A method of wireless communication performed by a network node, comprising:

receiving capability information indicating that a user equipment (UE) is configured to perform multi-level coding (MLC) decoding for one or more bits of a plurality of constellation bits, wherein receiving the capability information comprises receiving a plurality of capability information bits, wherein a first value of a bit of the plurality of capability information bits indicates that the UE is not configured to perform MLC decoding associated with the bit or a second value of the bit indicates that the UE is configured to perform the MLC decoding associated with the bit; and transmitting, in accordance with the capability information, configuration information that indicates for the UE to perform bit-interleaved coded modulation (BICM) decoding for a first set of bits of the plurality of constellation bits and to perform MLC decoding for a second set of bits of the plurality of constellation bits, the second set of bits being based at least in part on the capability information.

* * * * *